(12) United States Patent
Shen et al.

(10) Patent No.: US 7,239,667 B2
(45) Date of Patent: Jul. 3, 2007

(54) 8 PSK ROTATIONALLY INVARIANT TURBO TRELLIS CODED MODULATION WITHOUT PARALLEL TRANSITIONS

(75) Inventors: Ba-Zhong Shen, Irvine, CA (US); Kelly Brian Cameron, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 742 days.

(21) Appl. No.: 10/407,012

(22) Filed: Apr. 3, 2003

(65) Prior Publication Data

US 2004/0184560 A1 Sep. 23, 2004

Related U.S. Application Data

(60) Provisional application No. 60/455,734, filed on Mar. 18, 2003.

(51) Int. Cl.
*H04L 5/12* (2006.01)

(52) U.S. Cl. .................... 375/265; 375/308; 375/279

(58) Field of Classification Search ............... 375/140, 375/265, 269, 308, 279; 714/700
See application file for complete search history.

(56) References Cited

U.S. PATENT DOCUMENTS

| | | | |
|---|---|---|---|
| 5,406,570 A | 4/1995 | Berrou et al. | |
| 5,446,747 A | 8/1995 | Berrou | |
| 5,563,897 A | 10/1996 | Pyndiah et al. | |
| 5,621,761 A * | 4/1997 | Heegard | 375/265 |
| 6,065,147 A | 5/2000 | Pyndiah et al. | |
| 6,119,264 A | 9/2000 | Berrou et al. | |
| 6,122,763 A | 9/2000 | Pyndiah et al. | |
| 6,757,859 B1 * | 6/2004 | Jin | 714/755 |
| 2002/0051499 A1 * | 5/2002 | Cameron et al. | 375/295 |

FOREIGN PATENT DOCUMENTS

| | | |
|---|---|---|
| EP | 0 735 696 A2 | 10/1996 |
| EP | 0 735 696 A3 | 1/1999 |
| FR | 91 05278 A1 | 10/1992 |

* cited by examiner

*Primary Examiner*—Mohammed Ghayour
*Assistant Examiner*—Leila Malek
(74) *Attorney, Agent, or Firm*—Garlick Harrison & Markison; Shayne X. Short

(57) ABSTRACT

8 PSK (Phase Shift Keying) rotationally invariant turbo trellis coded modulation without parallel transitions. A novel approach of coding 8 PSK symbols such that they are rotationally invariant employs precoding and encoding according to Turbo Trellis Coded Modulation (TTCM). Together, the preceding and TTCM encoding operate cooperatively to provide rotational invariance of the 8 PSK symbols. These 8 PSK symbols are mapped to constellation points within an 8 PSK constellation. A permutated mapping of the 8 PSK constellation is also employed that describes an approximate 90 degree rotation of the 8 PSK constellation mapping. In addition, the precoding employs an induced precoder mapping that corresponds to the approximate 90 degree rotation of the mapping of the 8 PSK constellation. Moreover, the branches of the trellis employed within the TTCM encoding may undergo an appropriately modified mapping to accommodate the 90 degree rotation of the 8 PSK constellation mapping as well.

30 Claims, 22 Drawing Sheets communication system

High Definition Television (HDTV) communication system uni-directional microwave communication system bi-directional microwave communication system uni-directional point-to-point radio communication system bi-directional point-to-point radio communication system

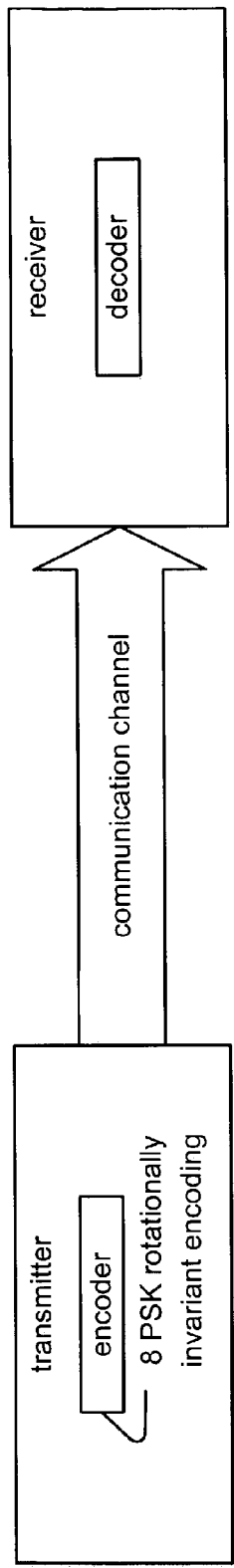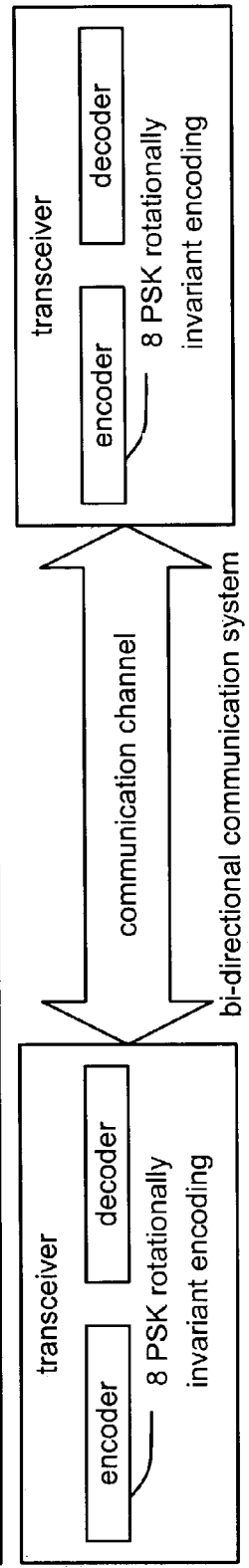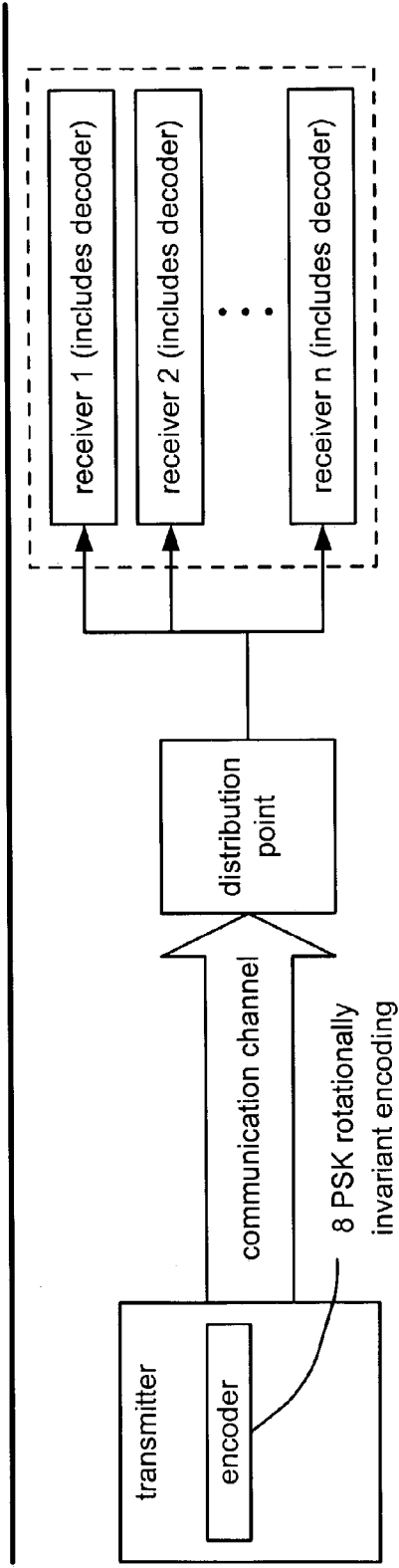
Fig. 8A
Fig. 8B
Fig. 8C

8 PSK rotationally invariant encoding

Turbo Trellis Coded Modulation (TTCM) communication system

Turbo Trellis Coded Modulation (TTCM) encoder precoder convolutional encoder (constituent encoder)

rotationally invariant combined precoder and encoder

1st design attempt of rotationally invariant trellis (but not recursive)

permutation to describe 90 degree rotation of this 8 PSK constellation's mapping (0123)(4567)

mapping of 8 PSK constellation rotationally invariant trellis (induced permutation map of states (0617)(2534))

rotationally invariant trellis (showing appropriately modified mapping)

8 PSK rotationally invariant encoding method

8 PSK rotationally invariant encoding method

8 PSK rotationally invariant encoding method performance of 90 degree rotationally invariant 8 PSK Turbo Trellis Coded Modulation (TTCM) with 2/3 code rate

US 7,239,667 B2

8 PSK ROTATIONALLY INVARIANT TURBO TRELLIS CODED MODULATION WITHOUT PARALLEL TRANSITIONS

CROSS REFERENCE TO RELATED PATENTS/PATENT APPLICATIONS

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:

1. U.S. Provisional Application Ser. No. 60/455,734, entitled "8 PSK rotationally invariant turbo trellis coded modulation without parallel transitions," filed Mar. 18, 2003, pending.

BACKGROUND OF THE INVENTION

1. Technical Field of the Invention

The invention relates generally to communication systems; and, more particularly, it relates to constellation rotational errors that may be experienced in such communication systems dues to effects such as carrier frequency offset.

2. Description of Related Art

Data communication systems have been under continual development for many years. One very effective type of coding employed within many communication systems is that of Trellis Coded Modulation (TCM). When coding symbols using TCM, there are a variety of types of constellation to which the symbols may be mapped. For example, one type of symbol includes 8 PSK (Phase Shift Keying) mapped symbols. Each of the symbols in this constellation type typically have a common magnitude and are separated in phase around the I,Q (In-phase, Quadrature) plane's origin. One difficulty that can arise when employing an 8 PSK modulation (that includes the 8 PSK shaped constellation and a particular mapping of the constellation points in that constellation) is when the axes of the I,Q plane are rotated by some offset. A number of sources may cause this offset between the 8 PSK constellation by which 8 PSK symbols are encoded and an 8 PSK constellation at which the 8 PSK symbols are decoded. One potential source of such rotational offset may be a Carrier Frequency Offset (CFO) between the local oscillators employed at the transmitter end of a communication channel and at the receiver end of the communication channel.

If this rotational offset does occur, then the mapping of the symbols may be performed incorrectly. For example, the mapping of the 8 PSK symbols to the appropriate constellation points within the 8 PSK constellation may be performed erroneously.

There have been some attempts in the art to try to generate a code that is resilient and operable to code 8 PSK symbols such that they are rotationally invariant; in other words, some attempts have been made to try to ensure that the information encoded using TCM coding and an 8 PSK shaped constellation may be able to accommodate a rotational offset and still be able to communicate data effectively from one place (e.g., a transmitter) to another (e.g., a receiver). However, attempts to do this have, so far, been met with serious problems that have yet to be overcome.

More specifically, up to now, any constructed code that is operable to encode 8 PSK symbols using TCM without parallel transitions is either not rationally invariant at all or else has a catastrophic operation as described in the following references: [1] A. Fung and P. McLane, "Phase jitter sensitivity of rotationally invariant and 16 point trellis codes," *IEEE Proceedings-I*, Vol. 138, No. 4, August 1991, pp. 247–255, [2] E. Biglieri, D. Divsalar, P. J. McLane and M. K. Simon, *Introduction to trellis-coded modulation with application*, Macmillan Publishing Co., New York, 1991, and [3] W. Liu and S. G. Wilson, "Rotationally-invariant concatenated (turbo) TCM codes," *Signals, Systems and Computers*, 1999. Conference Record of the Thirty-Third Asilomar Conference on, Vol. 1, 1999, pp. 32–36.

While there has clearly been a significant amount of effort in the field of communications to try to address this rotational problem within 8 PSK constellations, no solution has yet to present an effective solution to overcome this problem. Moreover, in the context of TCM coding that is performed using no parallel transitions, there has yet to be an effective solution presented in the art to overcome this problem.

BRIEF SUMMARY OF THE INVENTION

Various aspects of the invention can be found in an 8 PSK (Phase Shift Keying) rotationally invariant encoding method. The method operates to ensure rotational invariance of the 8 PSK symbols generated therein. The method then involves receiving a plurality of input bits, and then preceding the plurality of input bits thereby generating a plurality of precoded bits. Afterwards, the method involves encoding of the plurality of precoding bits using Turbo Trellis Coded Modulation (TTCM) encoding thereby generating a plurality of encoded bits. These encoded bits are then selectively grouped into a plurality of 8 PSK symbols having 3 bits each. The method then involves mapping each 8 PSK symbol of the plurality of 8 PSK symbols to a corresponding constellation point within an 8 PSK constellation having an 8 PSK constellation mapping and a permutation that describes an approximate 90 degree rotation of the 8 PSK constellation mapping.

These digital symbols at this point include rotational invariance. These digital 8 PSK symbols may be viewed as being a digital signal at this point. This digital signal is then transformed in an analog baseband signal whose I,Q (In-phase, Quadrature) components correspond to the mappings of the 8 PSK symbols to the constellation points within the 8 PSK constellation. The method operates such that the preceding and the encoding operate cooperatively to provide rotational invariance of the 8 PSK symbols within the plurality of 8 PSK symbols that are mapped to the constellation points within the 8 PSK constellation. The TTCM encoding employs a trellis that includes an induced permutation mapping that corresponds to the approximate 90 degree rotation of the 8 PSK constellation mapping.

In certain embodiments, the method may be further described as including TTCM encoding such that the TTCM encoding employs a finite state set whose states may be mapped using branches of an induced state mapping, and each branch of the trellis may be represented by at least one branch of the induced state mapping. The operation of the precoding and the encoding that provides rotational invariance of the 8 PSK symbols introduces a coding loss, and the TTCM encoding provides a turbo code gain that offsets the coding loss. The rotational invariance of the 8 PSK symbols is operable to accommodate a rotation of the 8 PSK constellation by approximately 90 degrees in either of a clockwise direction or a counter-clockwise direction. The 90 degree rotation of the 8 PSK constellation may be generated by a number of causes including a Carrier Frequency Offset (CFO) between a local oscillator in a communication transmitter and a local oscillator in a communication receiver. To support the rotational invariance described herein, the precoding employs an induced precoder mapping that corresponds to the approximate 90 degree rotation of the 8 PSK constellation mapping.

The TTCM may be implemented such that it performs even bit interleaving and odd bit interleaving on the precoded bits. That is to say, modified interleaving may be performed depending on the relative position of the precoded bits. For example, a first bit (such as an odd bit) may be interleaved using one type of interleaving, and a second bit (such as an even bit) may be interleaved using another type of interleaving. The method may also involve providing the analog baseband signal to a communication channel. Alternatively, the method may involve up converting a carrier frequency of the analog baseband signal thereby generating an up converted signal, and then providing the up converted signal to a communication channel.

The method may be performed in a number of devices including a communication transmitter. Such a communication transmitter may be implemented within any one of a satellite communication system, a High Definition Television (HDTV) communication system, a cellular communication system, a microwave communication system, a point-to-point communication system, a uni-directional communication system, a bi-directional communication system, or a one to many communication system.

BRIEF DESCRIPTION OF THE SEVERAL VIEWS OF THE DRAWINGS

FIG. 8A is a system diagram illustrating an embodiment of a uni-directional communication system that is built according to the invention.

FIG. 8B is a system diagram illustrating an embodiment of a bi-directional communication system that is built according to the invention.

FIG. 8C is a system diagram illustrating an embodiment of a one to many communication system that is built according to the invention.

DETAILED DESCRIPTION OF THE INVENTION

As described above, there has been a great deal of effort in the field of communications to try to address the problem of constellation rotation within codes that employ 8 PSK (Phase Shift Keying) modulations. The invention presents a 90° rotationally invariant 8 PSK Turbo Trellis Coded Modulation (TTCM) code that is implemented without parallel transitions. While there is some cost associated with implementing a code that supports rotational invariance, the use of TTCM coding provides a turbo code gain that offsets the loss associated with coding to ensure rotational invariance. For example, the precoding and the encoding, that are performed according to the invention, to provide for rotational invariance of 8 PSK symbols introduces some of a coding loss, and the TTCM encoding operates to provide a turbo code gain that offsets the coding loss. More specifically, in one embodiment, the performance degradation of this code to support the rotationally invariant TTCM is about 0.75 dB at bit error probability of approximately $10^{-5}$.

Figure 1:
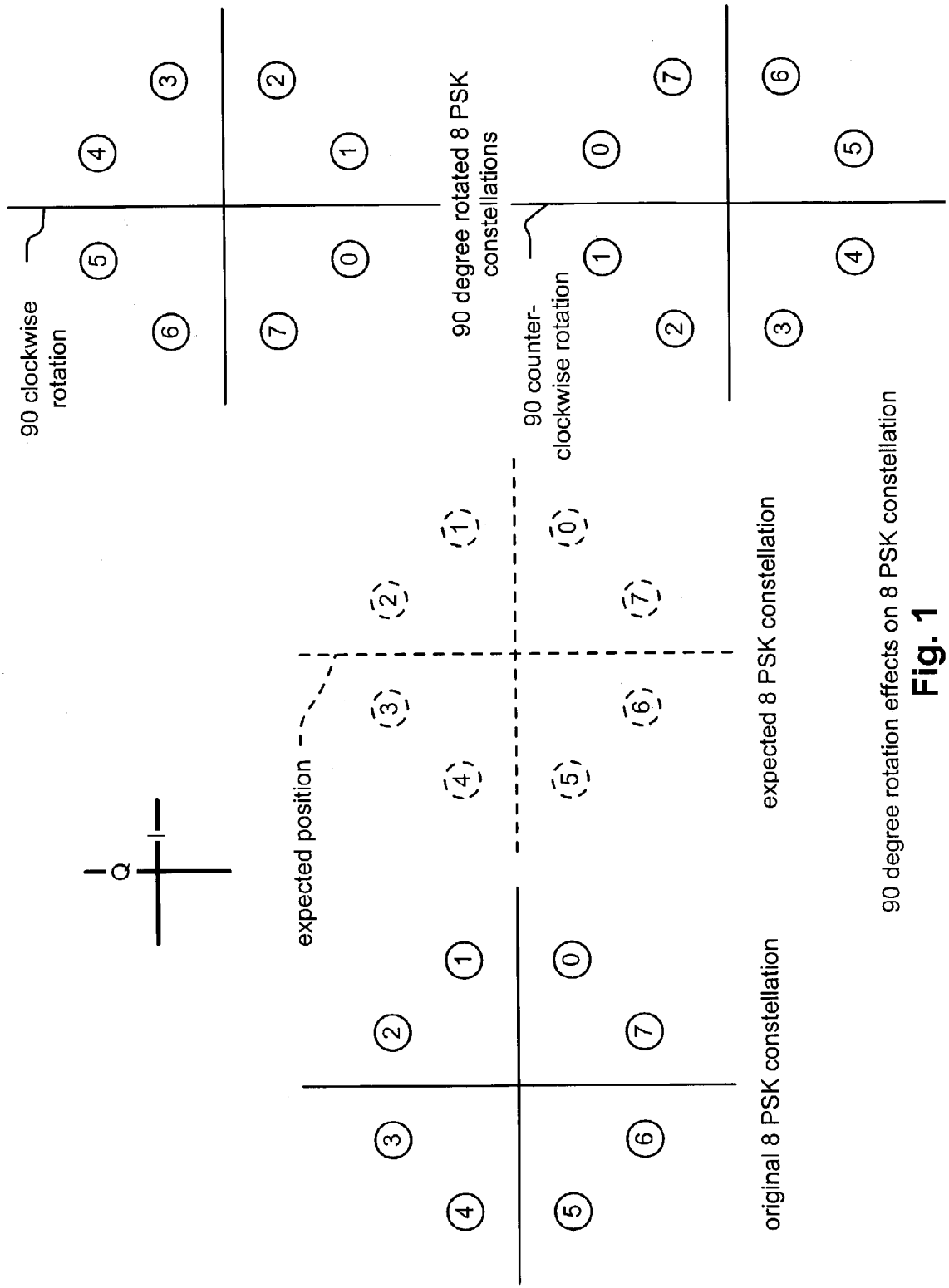
FIG. 1 is a diagram illustrating an embodiment of 90 degree rotation effects on an 8 PSK constellation.

FIG. 1 is a diagram illustrating an embodiment of 90° (90 degree) rotation effects on an 8 PSK constellation. For a more complete understanding of the undesirable effects of rotation of an 8 PSK constellation, the effects of 90° rotation in both the clockwise and counter-clockwise directions are illustrated. On the left hand side of FIG. 1 is an original 8 PSK constellation having a mapping. The mapping of groups of 3 bits into respective 8 PSK symbols may be made, and the values of those 3 bits, in binary, may be used as the indexing of the corresponding constellation point within the 8 PSK constellation. For example, the 3 bits "000" may be used to index to the 8 PSK constellation point referenced by "0," and the 3 bits "001" may be used to index to the 8 PSK constellation point referenced by "1." Analogously, the 3 bits "010" may be used to index to the 8 PSK constellation point referenced by "2," and the 3 bits "011" may be used to index to the 8 PSK constellation point referenced by "3," and so on.

Symbols are coded using the modulation encoding of this 8 PSK constellation at a transmitter end of a communication channel. When 8 PSK symbols are then transmitted from then transmitter end of the communication channel to a receiver end of the communication channel, a comparable 8 PSK constellation is used at the receiver to perform proper decoding of the received symbols. Specifically, an expected 8 PSK constellation would ideally be used at the receiver end of the communication channel. The frame of reference of the expected 8 PSK constellation is the same as that of the original 8 PSK constellation. However, because of a variety of reasons, including a Carrier Frequency Offset (CFO) between the local oscillators at the transmitter and receiver ends of a communication channel, the 8 PSK at the receiver end may be rotated to some degree with respect to the frame of reference at the transmitter end.

In the upper right hand corner of FIG. 1, a 90° clockwise rotation of the original 8 PSK constellation is shown, and in the lower right hand corner of FIG. 1, a 90° counter-clockwise rotation of the original 8 PSK constellation is shown. As can be seen, then the 8 PSK symbol indexed by "001" or "1" is expected to be located in the upper right hand quadrant of the I,Q plane, just above the I axis. However, when the 8 PSK has been rotated in the clockwise direction by 90°, this constellation point location will actually correspond to the 8 PSK symbol indexed by "011" or "3." When the 8 PSK has been rotated in the counter-clockwise direction by 90°, this constellation point location will actually correspond to the 8 PSK symbol indexed by "111" or "7." Clearly, a great deal of loss of information may be realized when a rotation of the 8 PSK constellation undesirably occurs, given that the mapping of the constellation point may be completely erroneous. The invention presents a coding solution such that a 90° rotation may occur without a significant degradation of performance. While there is some cost associated with a code that ensures rotational invariance of an 8 PSK constellation, the use of TTCM encoding is operable to offset that signal loss. The invention presents a solution that does not provide a significant degradation of signal loss while ensuring rotational invariance of the 8 PSK constellation.

Figure 2:
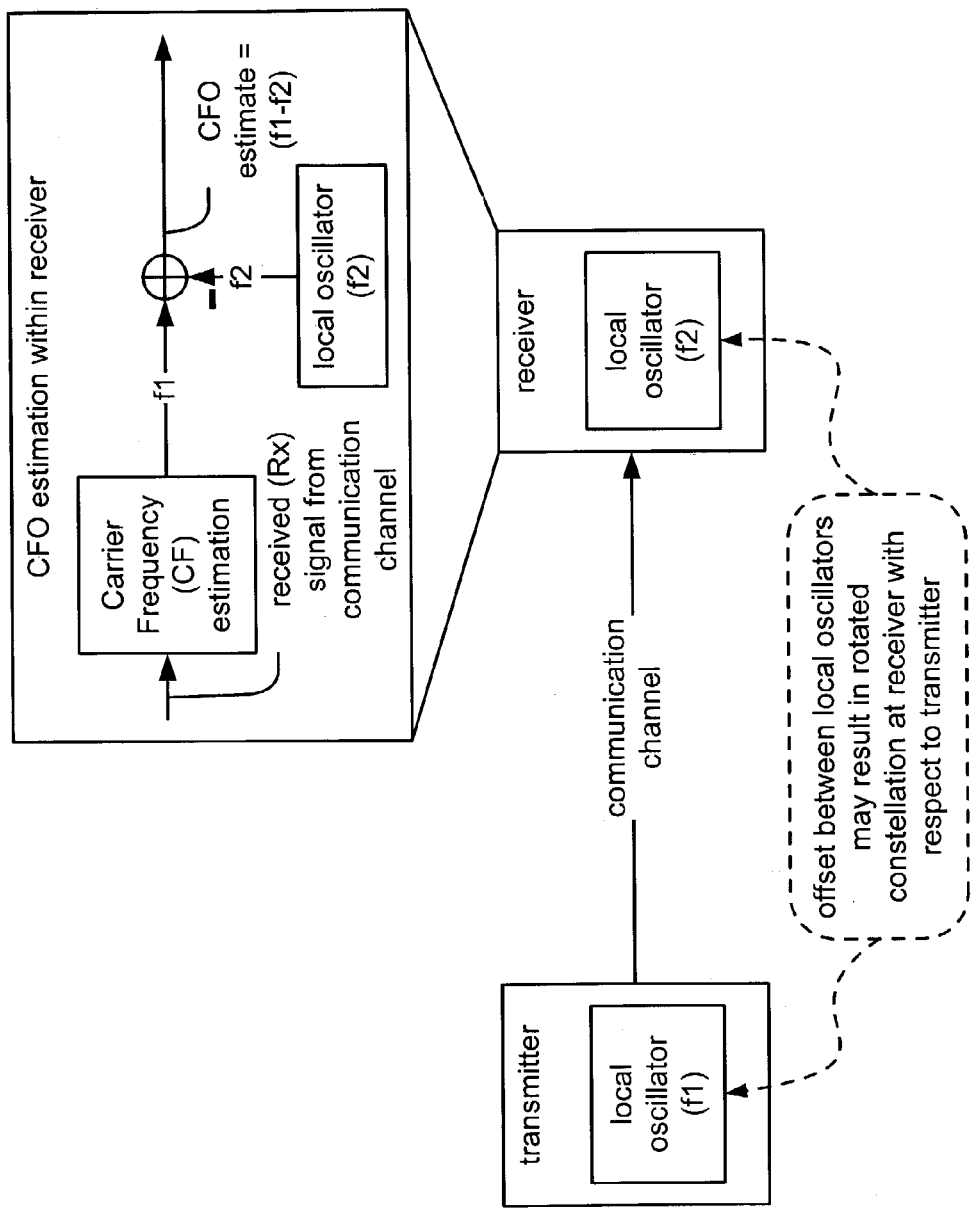
FIG. 2 is a diagram illustrating an embodiment of a communication system that performs Carrier Frequency Offset (CFO) estimation within a receiver according to the invention.

FIG. 2 is a diagram illustrating an embodiment of a communication system that performs Carrier Frequency Offset (CFO) estimation within a receiver according to the invention. A basic representation of a communication system is shown that includes a communication transmitter and a communication receiver. Each of the communication transmitter and the communication receiver includes a local oscillator, respectively. For example, the local oscillator of the communication transmitter operates at a frequency shown as f1, and the local oscillator of the communication receiver operates at a frequency shown as f2. A signal is transmitted from the communication transmitter to the communication receiver via a communication channel.

This signal is then received by the communication receiver. A Carrier Frequency (CF) estimation functional block estimates the CF of the signal. In this CF estimation functional block, the CF of the received signal is determined as being f1. In addition, the frequency of the local oscillator within the communication receiver, f2, is known (as it is produced locally in the communication receiver). A Carrier Frequency Offset (CFO) occurs when the received signal includes a CF (e.g., f1) that is different than the frequency generated by the local oscillator in the communication receiver (e.g., f2). The difference between f1 and f2 is determined, shown as the CFO estimate (e.g., f1–f2). This CFO between the local oscillators of the may result in a rotated 8 PSK constellation at the communication receiver with respect to the communication transmitter.

While the FIG. 1 and FIG. 2 show the potentially deleterious effects that may be realized when operating a communication system such that the frame of reference of an 8 PSK constellation at a communication transmitter end of a communication channel is different than that at a communication receiver end of the communication channel, several of the following Figures (FIG. 3, FIG. 4, FIG. 5A, FIG. 5B, FIG. 5C, FIG. 6A, FIG. 6B, FIG. 7A, FIG. 7B, FIG. 8A, FIG. 8B, and FIG. 8C) show some of many possible embodiments in which the invention may be implemented to support an 8 PSK rotationally invariant TTCM without parallel transitions according to the invention.

Figure 3:
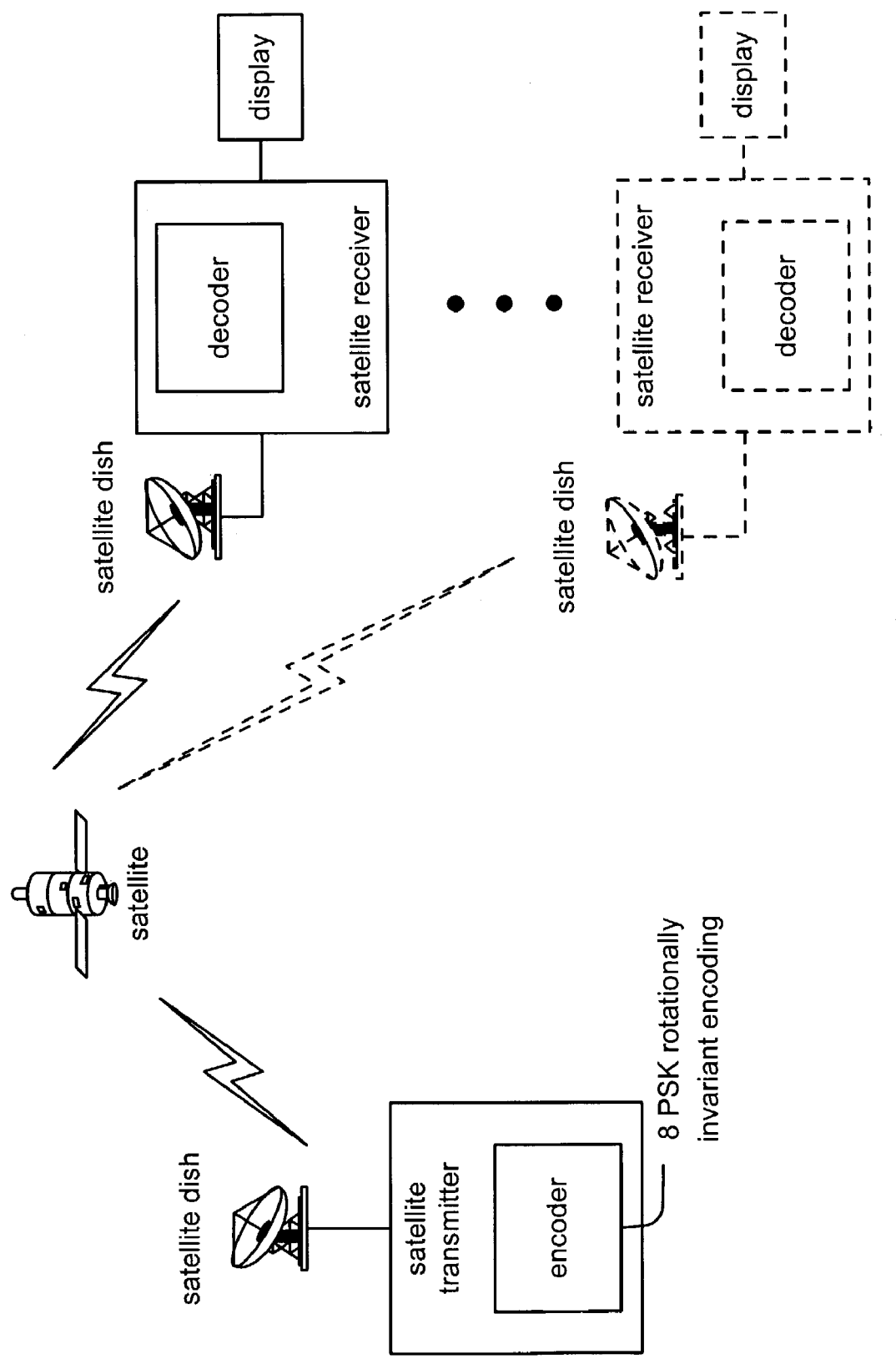
FIG. 3 is a system diagram illustrating an embodiment of a satellite communication system that is built according to the invention.

FIG. 3 is a system diagram illustrating an embodiment of a satellite communication system that is built according to the invention. A satellite transmitter is communicatively coupled to a satellite dish that is operable to communicate with a satellite. The satellite transmitter may also be communicatively coupled to a wired network. This wired network may include any number of networks including the Internet, proprietary networks, and/or other wired networks. The satellite transmitter employs the satellite dish to communicate to the satellite via a wireless communication channel. The satellite is able to communicate with one or more satellite receivers (each having a satellite dish). Each of the satellite receivers may also be communicatively coupled to a display.

Here, the communication to and from the satellite may cooperatively be viewed as being a wireless communication channel, or each of the communication to and from the satellite may be viewed as being two distinct wireless communication channels.

For example, the wireless communication "channel" may be viewed as not including multiple wireless hops in one embodiment. In other multi-hop embodiments, the satellite receives a signal received from the satellite transmitter (via its satellite dish), amplifies it, and relays it to satellite receiver. (via its satellite dish); the satellite receiver may also be implemented using terrestrial receivers such as satellite receivers, satellite based telephones, and/or satellite based Internet receivers, among other receiver types. In the case where the satellite receives a signal received from the satellite transmitter (via its satellite dish), amplifies it, and relays it, the satellite may be viewed as being a "transponder;" this is a multi-hop embodiment. In addition, other satellites may exist that perform both receiver and transmitter operations in cooperation with the satellite. In this case, each leg of an up-down transmission via the wireless communication channel would be considered separately.

In whichever embodiment, the satellite communicates with the satellite receiver. The satellite receiver may be viewed as being a mobile unit in certain embodiments (employing a local antenna); alternatively, the satellite receiver may be viewed as being a satellite earth station that may be communicatively coupled to a wired network in a similar manner in which the satellite transmitter may also be communicatively coupled to a wired network.

The satellite transmitter is operable to encode information (using an encoder) that is to be transmitted to the satellite receiver; the satellite receiver is operable to decode the transmitted signal (using a decoder). The encoder is operable to encode information using 8 PSK rotationally invariant encoding according to the invention. The FIG. 3 shows just one of the many embodiments where 8 PSK rotationally invariant encoding may be performed according to the invention.

Figure 4:
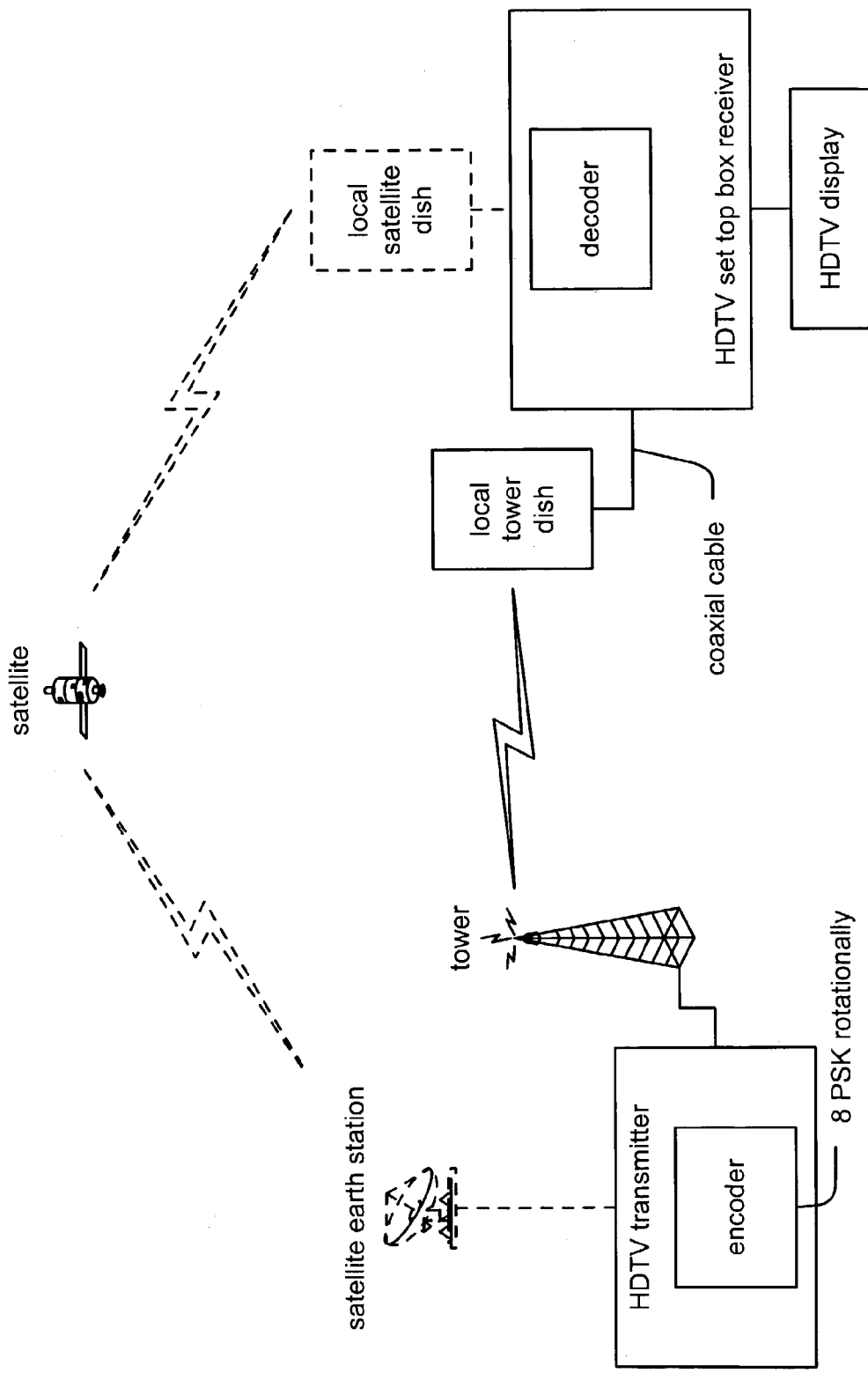
FIG. 4 is a system diagram illustrating an embodiment of a High Definition Television (HDTV) communication system that is built according to the invention.

FIG. 4 is a system diagram illustrating an embodiment of a High Definition Television (HDTV) communication system that is built according to the invention. An HDTV transmitter is communicatively coupled to a tower. The HDTV transmitter, using its tower, transmits a signal to a local tower dish via a wireless communication channel. The local tower dish may communicatively couple to an HDTV set top box receiver via a coaxial cable. The HDTV set top box receiver includes the functionality to receive the wireless transmitted signal that has been received by the local tower dish; this may include any transformation and/or down-converting that may be needed to accommodate any up-converting that may have been performed before and during transmission of the signal from the HDTV transmitter and its tower.

The HDTV set top box receiver is also communicatively coupled to an HDTV display that is able to display the demodulated and decoded wireless transmitted signals received by the HDTV set top box receiver and its local tower dish. The HDTV transmitter (via its tower) transmits a signal directly to the local tower dish via the wireless communication channel in this embodiment. In alternative embodiments, the HDTV transmitter may first receive a signal from a satellite, using a satellite earth station that is communicatively coupled to the HDTV transmitter, and then transmit this received signal to the local tower dish via the wireless communication channel. In this situation, the HDTV transmitter operates as a relaying element to transfer a signal originally provided by the satellite that is destined for the HDTV set top box receiver. For example, another satellite earth station may first transmit a signal to the satellite from another location, and the satellite may relay this signal to the satellite earth station that is communicatively coupled to the HDTV transmitter. The HDTV transmitter performs receiver functionality and then transmits its received signal to the local tower dish.

In even other embodiments, the HDTV transmitter employs its satellite earth station to communicate to the satellite via a wireless communication channel. The satellite is able to communicate with a local satellite dish; the local satellite dish communicatively couples to the HDTV set top box receiver via a coaxial cable. This path of transmission shows yet another communication path where the HDTV set top box receiver may communicate with the HDTV transmitter.

In whichever embodiment and whichever signal path the HDTV transmitter employs to communicate with the HDTV set top box receiver, the HDTV set top box receiver is operable to receive communication transmissions from the HDTV transmitter.

The HDTV transmitter is operable to encode information (using an encoder) that is to be transmitted to the HDTV set top box receiver; the HDTV set top box receiver is operable to decode the transmitted signal (using a decoder). The encoder is operable to encode information using 8 PSK rotationally invariant encoding according to the invention.

The FIG. 4 shows just one of the many embodiments where 8 PSK rotationally invariant encoding may be performed according to the invention.

Figure 5A:
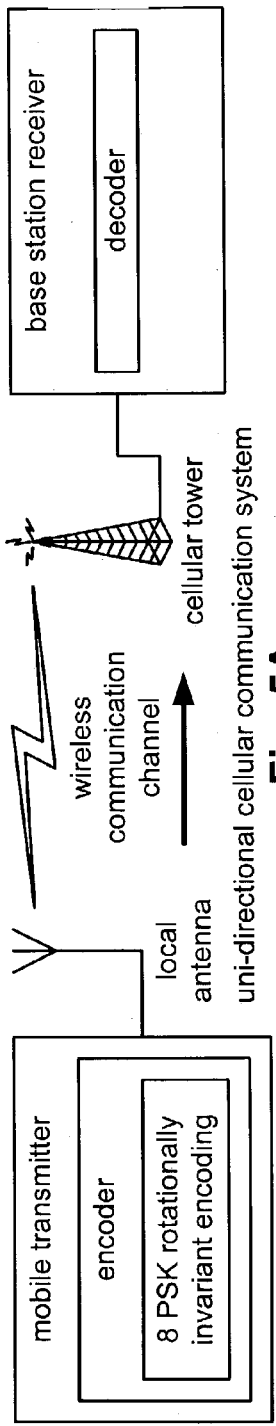
FIG. 5A and FIG. 5B are system diagrams illustrating embodiments of uni-directional cellular communication systems that are built according to the invention.
Figure 5B:
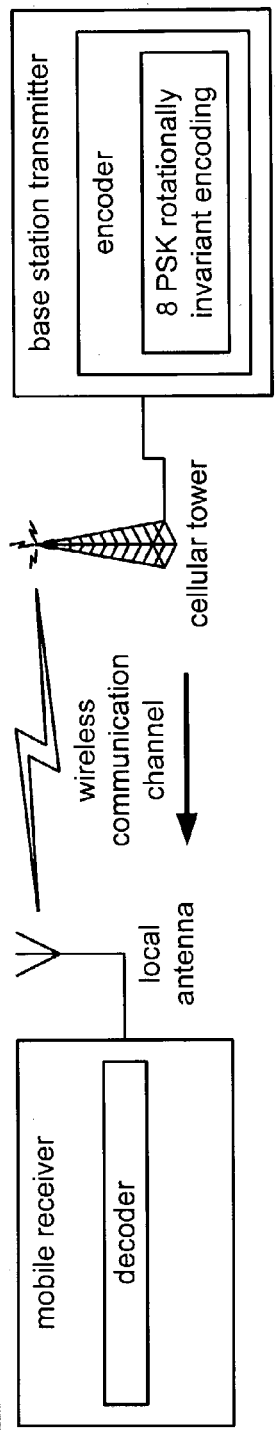

FIG. 5A and FIG. 5B are system diagrams illustrating embodiments of uni-directional cellular communication systems that are built according to the invention.

Referring to the FIG. 5A, a mobile transmitter includes a local antenna communicatively coupled thereto. The mobile transmitter may be any number of types of transmitters including a one way cellular telephone, a wireless pager unit, a mobile computer having transmit functionality, or any other type of mobile transmitter. The mobile transmitter transmits a signal, using its local antenna, to a cellular tower via a wireless communication channel. The cellular tower is communicatively coupled to a base station receiver; the receiving tower is operable to receive data transmission from the local antenna of the mobile transmitter that has been communicated via the wireless communication channel. The cellular tower communicatively couples the received signal to the base station receiver.

The mobile transmitter is operable to encode information (using an encoder) that is to be transmitted to the base station receiver; the base station receiver is operable to decode the transmitted signal (using a decoder).

The encoder is operable to encode information using 8 PSK rotationally invariant encoding according to the invention. The FIG. 5A shows yet another embodiment where 8 PSK rotationally invariant encoding may be performed according to the invention. The FIG. 5A shows a uni-directional cellular communication system where the communication goes from the mobile transmitter to the base station receiver via the wireless communication channel.

Referring to the FIG. 5B, a base station transmitter includes a cellular tower communicatively coupled thereto. The base station transmitter, using its cellular tower, transmits a signal to a mobile receiver via a communication channel. The mobile receiver may be any number of types of receivers including a one-way cellular telephone, a wireless pager unit, a mobile computer having receiver functionality, or any other type of mobile receiver. The mobile receiver is communicatively coupled to a local antenna; the local antenna is operable to receive data transmission from the cellular tower of the base station transmitter that has been communicated via the wireless communication channel. The local antenna communicatively couples the received signal to the mobile receiver.

The base station transmitter is operable to encode information (using an encoder) that is to be transmitted to the mobile receiver; the mobile receiver is operable to decode the transmitted signal (using a decoder).

The encoder is operable to encode information using 8 PSK rotationally invariant encoding according to the invention. The FIG. 5B shows yet another embodiment where 8 PSK rotationally invariant encoding may be performed according to the invention. The FIG. 5B shows a uni-directional cellular communication system where the communication goes from the base station transmitter to the mobile receiver via the wireless communication channel.

Figure 5C:
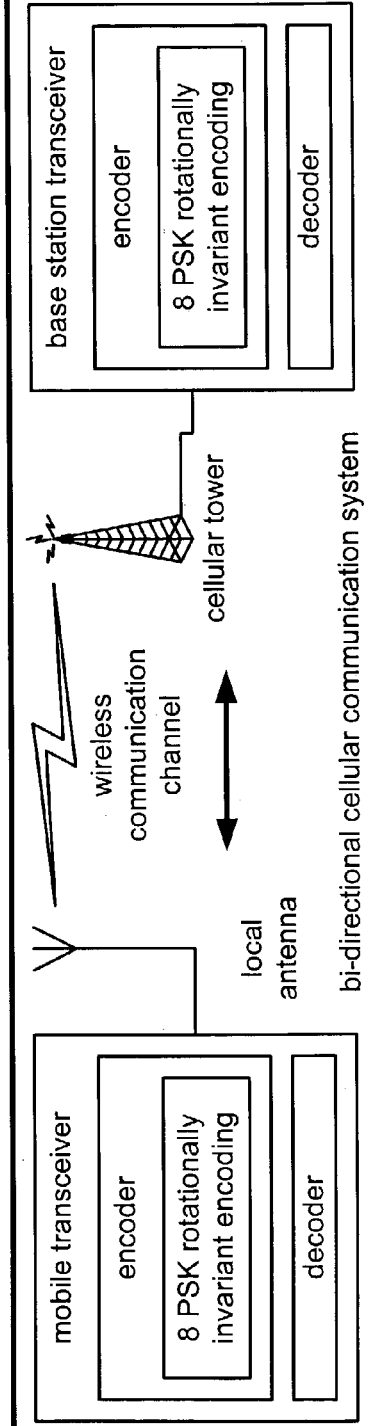
FIG. 5C is a system diagram illustrating an embodiment of a bi-directional cellular communication system that is built according to the invention.

FIG. 5C is a system diagram illustrating an embodiment of a bi-directional cellular communication system that is built according to the invention. The communication within this embodiment may go to and from the base station transceiver and to and from the mobile transceiver via the wireless communication channel.

Referring to the FIG. 5C, a base station transceiver includes a cellular tower communicatively coupled thereto. The base station transceiver, using its cellular tower, transmits a signal to a mobile transceiver via a communication channel. The reverse communication operation may also be performed. The mobile transceiver is able to transmit a signal to the base station transceiver as well. The mobile transceiver may be any number of types of transceiver including a cellular telephone, a wireless pager unit, a mobile computer having transceiver functionality, or any other type of mobile transceiver. The mobile transceiver is communicatively coupled to a local antenna; the local antenna is operable to receive data transmission from the cellular tower of the base station transceiver that has been communicated via the wireless communication channel. The local antenna communicatively couples the received signal to the mobile transceiver.

The base station transceiver is operable to encode information (using its encoder) that is to be transmitted to the mobile transceiver; the mobile transceiver is operable to decode the transmitted signal (using its decoder).

In addition, the mobile transceiver is operable to encode information (using its encoder) that is to be transmitted to the base station transceiver; the base station transceiver is operable to decode the transmitted signal (using its decoder).

The encoders within either one of the mobile transceiver and the base station transceiver may be implemented to encode information using 8 PSK rotationally invariant encoding according to the invention. The FIG. 5C shows yet another embodiment where 8 PSK rotationally invariant encoding may be performed according to the invention.

Figure 6A:
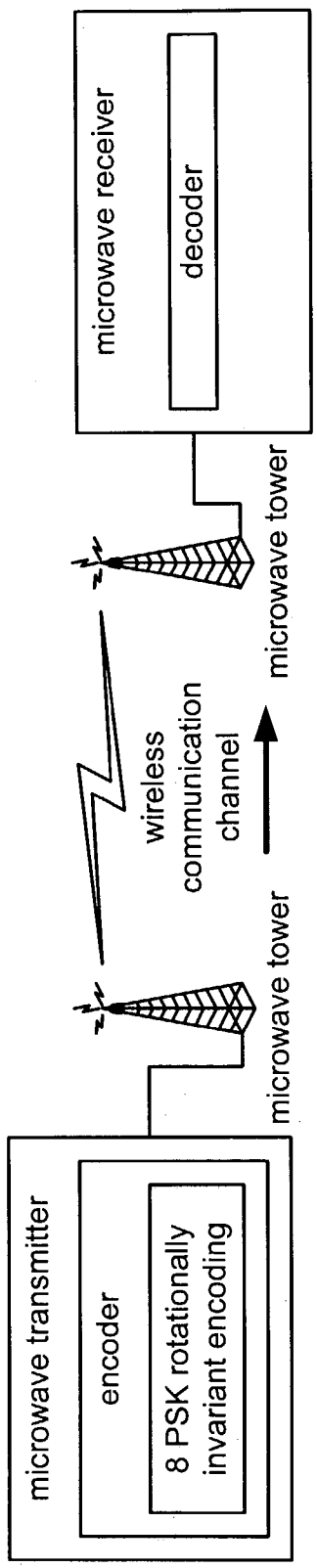
FIG. 6A is a system diagram illustrating an embodiment of a uni-directional microwave communication system that is built according to the invention.

FIG. 6A is a system diagram illustrating an embodiment of a uni-directional microwave communication system that is built according to the invention. A microwave transmitter is communicatively coupled to a microwave tower. The microwave transmitter, using its microwave tower, transmits a signal to a microwave tower via a wireless communication channel. A microwave receiver is communicatively coupled to the microwave tower. The microwave tower is able to receive transmissions from the microwave tower that have been communicated via the wireless communication channel.

The microwave transmitter is operable to encode information (using an encoder) that is to be transmitted to the microwave receiver; the microwave receiver is operable to decode the transmitted signal (using a decoder). The encoder is operable to encode information using 8 PSK rotationally invariant encoding according to the invention. The FIG. 6A shows yet another embodiment where 8 PSK rotationally invariant encoding may be performed according to the invention. The FIG. 6A shows a unidirectional microwave communication system where the communication goes from the microwave transmitter to the microwave receiver via the wireless communication channel.

Figure 6B:
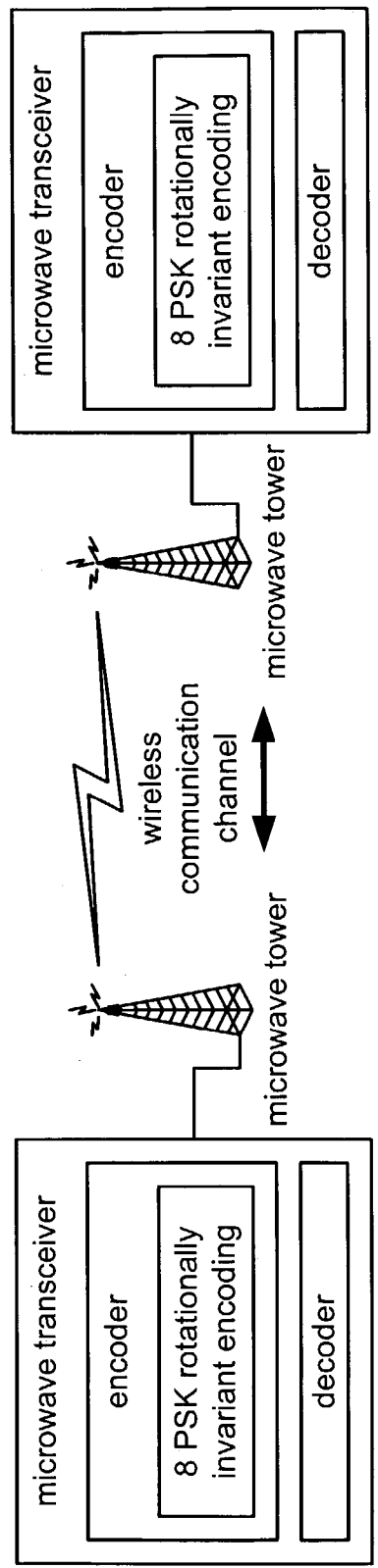
FIG. 6B is a system diagram illustrating an embodiment of a bi-directional microwave communication system that is built according to the invention.

FIG. 6B is a system diagram illustrating an embodiment of a bi-directional microwave communication: system that is built according to the invention. Within the FIG. 6B, a first microwave transceiver is communicatively coupled to a first microwave tower. The first microwave transceiver, using the first microwave tower (the first microwave transceiver's microwave tower), transmits a signal to a second microwave tower of a second microwave transceiver via a wireless communication channel. The second microwave transceiver is communicatively coupled to the second microwave tower (the second microwave transceiver's microwave tower). The second microwave tower is able to receive transmissions from the first microwave tower that have been communicated via the wireless communication channel. The reverse communication operation may also be performed using the first and second microwave transceivers.

Each of the microwave transceivers is operable to encode information (using an encoder) that is to be transmitted to the other microwave transceiver; each microwave transceiver is operable to decode the transmitted signal (using a decoder) that it receives. Each of the microwave transceivers includes an encoder and a decoder. The encoder of either of the transceivers that may be implemented to encode information using 8 PSK rotationally invariant encoding according to the invention. The FIG. 6B shows yet another embodiment where 8 PSK rotationally invariant encoding may be performed according to the invention.

Figure 7A:
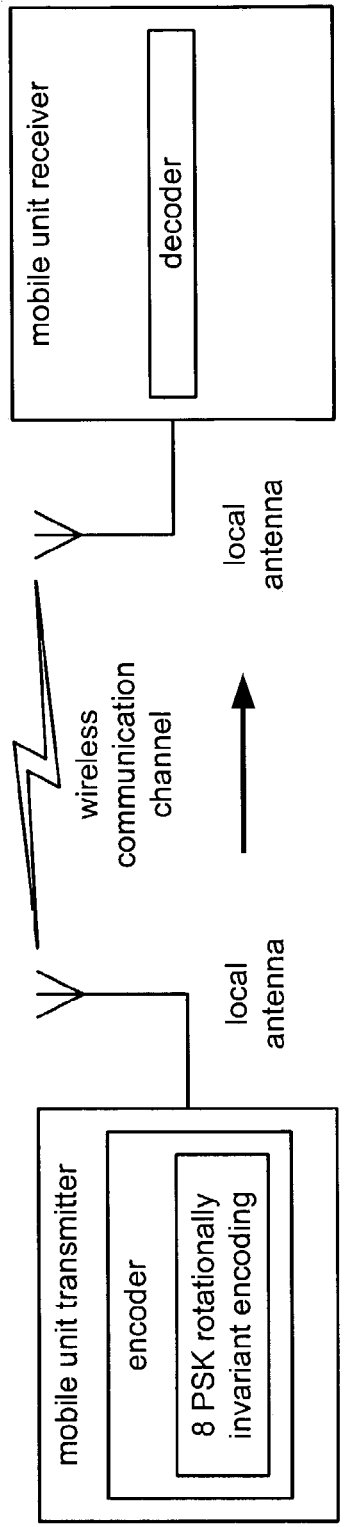
FIG. 7A is a system diagram illustrating an embodiment of a uni-directional point-to-point radio communication system that is built according to the invention.

FIG. 7A is a system diagram illustrating an embodiment of a uni-directional point-to-point radio communication system that is built according to the invention. A mobile unit transmitter includes a local antenna communicatively coupled thereto. The mobile unit transmitter, using its local antenna, transmits a signal to a local antenna of a mobile unit receiver via a wireless communication channel.

The mobile unit transmitter is operable to encode information (using an encoder) that is to be transmitted to the mobile unit receiver; the mobile unit receiver is operable to decode the transmitted signal (using a decoder). The encoder is operable to encode information using 8 PSK rotationally invariant encoding according to the invention. The FIG. 7A shows yet another embodiment where 8 PSK rotationally invariant encoding may be performed according to the invention. The FIG. 7A shows a uni-directional communication system where the communication goes from the mobile unit transmitter to the mobile unit receiver via the wireless communication channel.

Figure 7B:
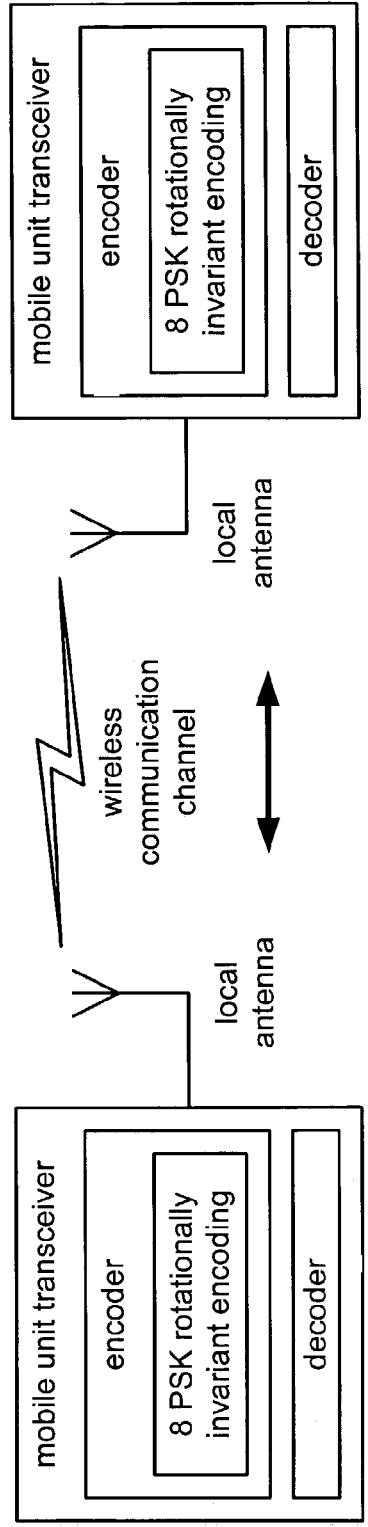
FIG. 7B is a system diagram illustrating an embodiment of a bi-directional point-to-point radio communication system that is built according to the invention.

FIG. 7B is a system diagram illustrating an embodiment of a bi-directional point-to-point radio communication system that is built according to the invention. Within the FIG. 7B, a first mobile unit transceiver is communicatively coupled to a first local antenna. The first mobile unit transceiver, using the first local antenna (the first mobile unit transceiver's local antenna), transmits a signal to a second local antenna of a second mobile unit transceiver via a wireless communication channel. The second mobile unit transceiver is communicatively coupled to the second local antenna (the second mobile unit transceiver's local antenna). The second local antenna is able to receive transmissions from the first local antenna that have been communicated via the communication channel. The reverse communication operation may also be performed using the first and second mobile unit transceivers.

Each mobile unit transceiver is operable to encode information (using an encoder) that is to be transmitted to the other mobile unit transceiver; each mobile unit transceiver is operable to decode the transmitted signal (using a decoder) that it receives. The encoder of either of the mobile unit transceivers may be implemented to encode information using 8 PSK rotationally invariant encoding according to the invention. The FIG. 7B shows yet another embodiment where 8 PSK rotationally invariant encoding may be performed according to the invention.

FIG. 8A is a system diagram illustrating an embodiment of a uni-directional communication system that is built according to the invention. A transmitter communicates to a receiver via a uni-directional communication channel. The uni-directional communication channel may be a wireline (or wired) communication channel or a wireless communication channel without departing from the scope and spirit of the invention. The wired media by which the uni-directional communication channel may be implemented are varied, including coaxial cable, fiber-optic cabling, and copper cabling, among other types of "wiring." Similarly, the wireless manners in which the uni-directional communication channel may be implemented are varied, including satellite communication, cellular communication, microwave communication, and radio communication, among other types of wireless communication.

The transmitter is operable to encode information (using an encoder) that is to be transmitted to the receiver; the receiver is operable to decode the transmitted signal (using a decoder). The encoder is operable to encode information using 8 PSK rotationally invariant encoding according to the invention. The FIG. 8A shows yet another embodiment where 8 PSK rotationally invariant encoding may be performed according to the invention.

FIG. 8B is a system diagram illustrating an embodiment of a bi-directional communication system that is built according to the invention. Within the FIG. 8B, a first transceiver is communicatively coupled to a second transceiver via a bi-directional communication channel. The bi-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

Each of the transceivers is operable to encode information (using an encoder) that is to be transmitted to the other transceiver; each transceiver is operable to decode the transmitted signal (using a decoder) that it receives. The encoder of either of the transceivers may be implemented to encode information using 8 PSK rotationally invariant encoding according to the invention. The FIG. 8B shows yet another embodiment where 8 PSK rotationally invariant encoding may be performed according to the invention.

FIG. 8C is a system diagram illustrating an embodiment of a one to many communication system that is built according to the invention. A transmitter is able to communicate, via broadcast in certain embodiments, with a number of receivers, shown as receivers 1, 2, . . . , n via a uni-directional communication channel. The uni-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

A distribution point is employed within the one to many communication system to provide the appropriate communication to the receivers 1, 2, . . . , and n. In certain embodiments, the receivers 1, 2, . . . , and n each receive the same communication and individually discern which portion of the total communication is intended for themselves.

The transmitter is operable to encode information (using an encoder) that is to be transmitted to the receivers 1, 2, . . . , and n; each of the receivers 1, 2, . . . , and n is operable to decode the transmitted signal (using a decoder).

The encoder is operable to encode information using 8 PSK rotationally invariant encoding according to the invention. The FIG. 8C shows yet another embodiment where 8 PSK rotationally invariant encoding may be performed according to the invention.

Figure 9:
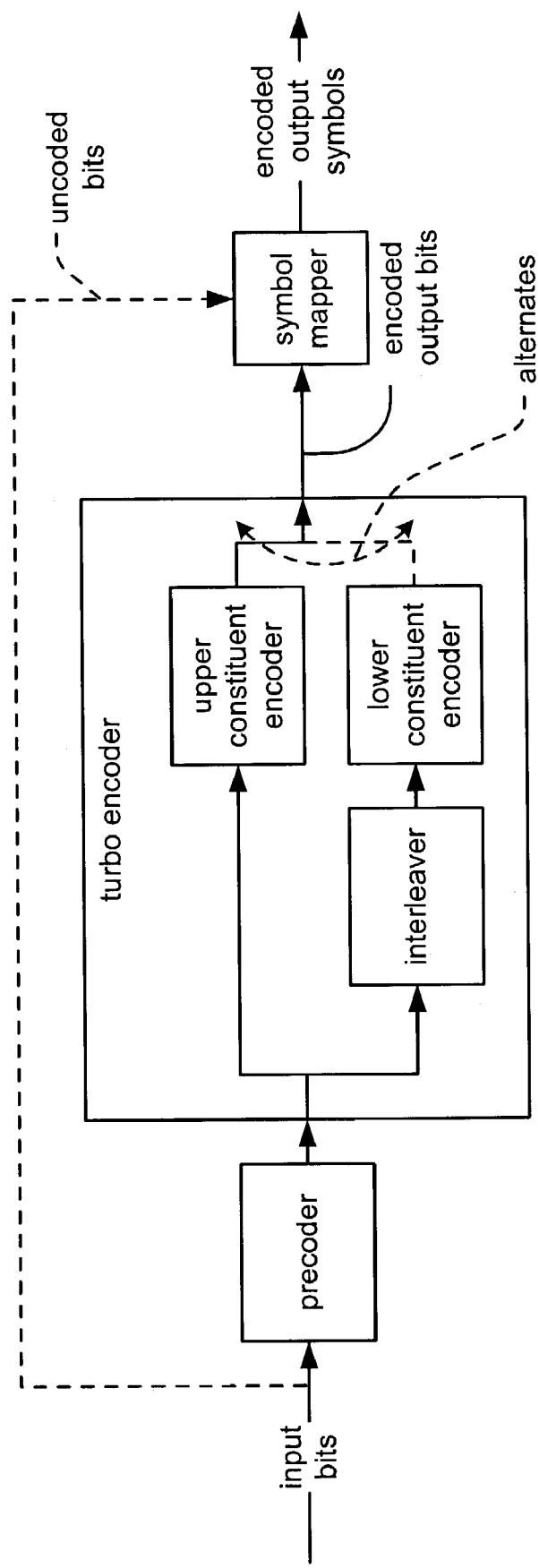
FIG. 9 is a diagram illustrating an embodiment of 8 PSK rotationally invariant encoding according to the invention.

FIG. 9 is a diagram illustrating an embodiment of 8 PSK rotationally invariant encoding according to the invention. Input bits are provided to a precoder. The precoder performs preceding on the input bits to generate precoded bits. It is also noted that the input bits may include one or more bits that will not undergo any precoding and/or encoding according to the invention.

These precoded bits are provided to a turbo encoder that is operable to perform encoding of the precoded bits to generate encoded bits. The turbo encoder includes an upper constituent encoder and a lower constituent encoder. The precoded bits are simultaneously provided to the upper constituent encoder and to an interleaver. The interleaver interleaves the precoded bits and provides them to the lower constituent encoder. Each of these constituent encoders may be implemented using convolutional encoders as known in the art.

The encoded bits, output from each of the upper constituent encoder and the lower constituent encoder are alternatively selected as the final output of the turbo encoder. These encoded output bits, from the turbo encoder, are provided to a symbol mapper that is operable to group the encoded bits into groups of 3 bits each. These 3 bit groups are then coded using an 8 PSK modulation (that includes an 8 PSK constellation and a mapping for each of the 8 constellation points in the 8 PSK constellation). It is again noted that one or more uncoded bits may also be provided to the symbol mapper, without having undergone precoding in the precoder and encoding in the turbo encoder, and be included as one or more bits into one of the 8 PSK symbols generated by the symbol mapper. The symbol mapper then outputs the 8 PSK modulation encoded symbols. These symbols may then be provided to a modulator that generates an analog baseband signal. This analog baseband signal may then be provided to a communication channel. Alternatively, after these symbols are provided to a modulator that generates the analog baseband signal, the analog baseband signal may be up converted to a higher carrier frequency for transmission on a communication channel.

The precoding of the precoder and the encoding of the turbo encoder operate cooperatively to provide rotational invariance of the 8 PSK symbols that are mapped to the constellation points within the 8 PSK constellation. Additional details are provided for how this rotational invariance may be achieved in some of the other embodiments described below as well.

Figure 10:
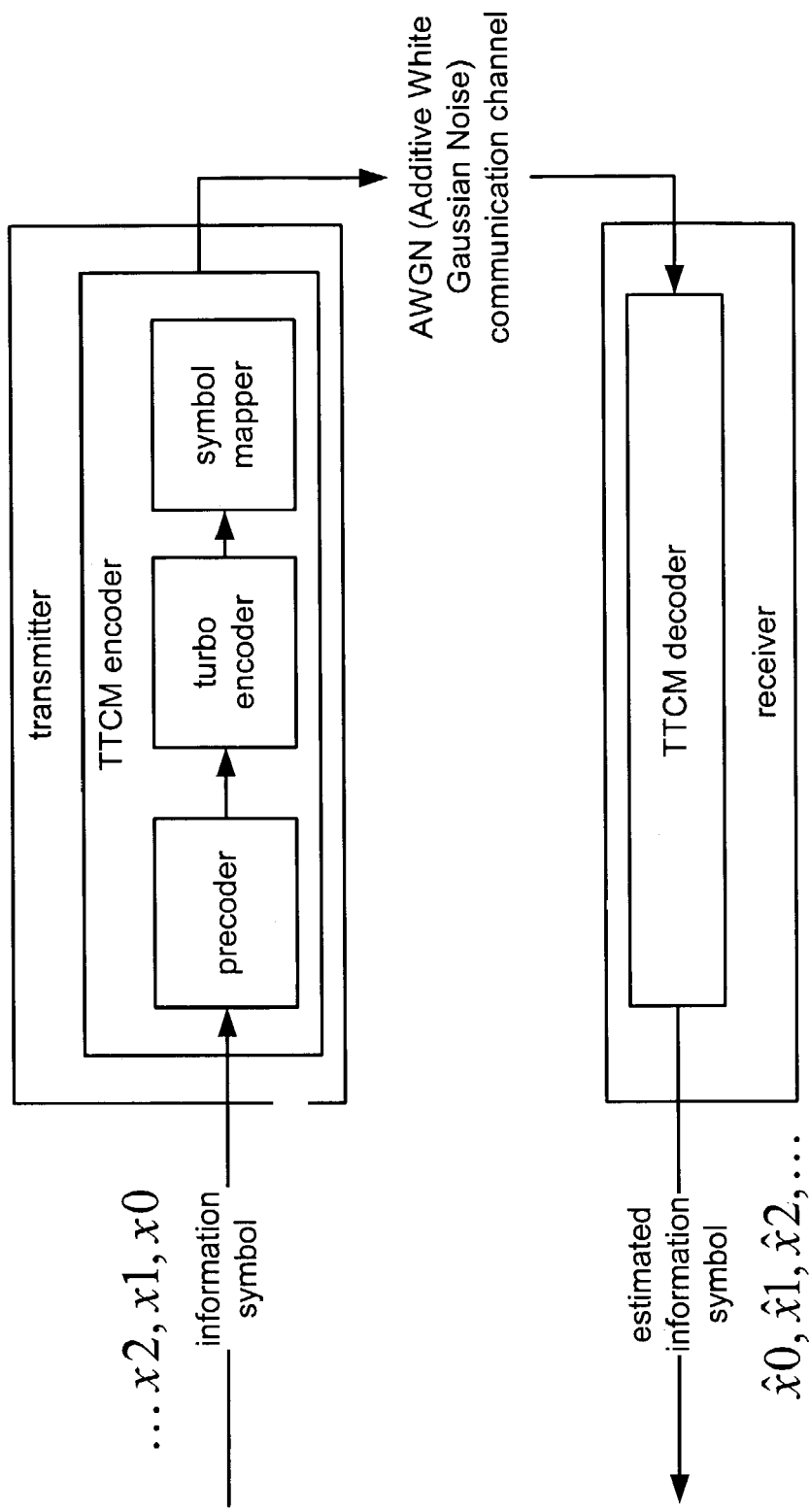
FIG. 10 is a system diagram illustrating an embodiment of a Turbo Trellis Coded Modulation (TTCM) communication system that is built according to the invention.

FIG. 10 is a system diagram illustrating an embodiment of a Turbo Trellis Coded Modulation (TTCM) communication system that is built according to the invention. The TTCM communication system includes a transmitter and a receiver that are communicatively coupled to one another via a communication channel that introduces Additive White Gaussian Noise (AWGN) to the signal. The communication channel may be wireline or wireless according to the invention. The AWGN communication channel may be viewed as being a relatively noisy communication channel in some embodiments.

The transmitter includes a TTCM encoder that encodes one or more information symbols and then modulates those encoded symbols according to an 8 PSK constellation and its corresponding mapping. The transmitter then prepares this signal for transmission across the communication channel.

At the other end of the communication channel, the receiver includes a TTCM decoder that receives and estimates the encoded symbols that have been transmitted across the communication channel. Further details of the operation of the various functional blocks contained within the TTCM encoder and the TTCM decoder are also described in more detail below.

Generally speaking, within the TTCM encoder, the precoder performs precoding to generate precoded symbols, the turbo encoder then performs the symbol encoding and the symbol mapper maps those encoded symbols to the appropriate 8 PSK modulation (including an 8 PSK constellation and its corresponding mapping). Similarly, generally speaking within the TTCM decoder, the TTCM decoder performs calculations that are employed to perform decoding of the received symbols.

Within the TTCM encoder, the precoding of the precoder and the encoding of the turbo encoder operate cooperatively to provide rotational invariance of the 8 PSK symbols that are mapped to the constellation points within the 8 PSK constellation.

It is also understood that a variety of means of modulation, transmission, receipt, and demodulation may be performed to generate the analog signals to be transmitted across the communication channel without departing from the scope and spirit thereof. Each and any such means may be practiced according to the invention while performing the TTCM encoding/decoding described herein.

Figure 11:
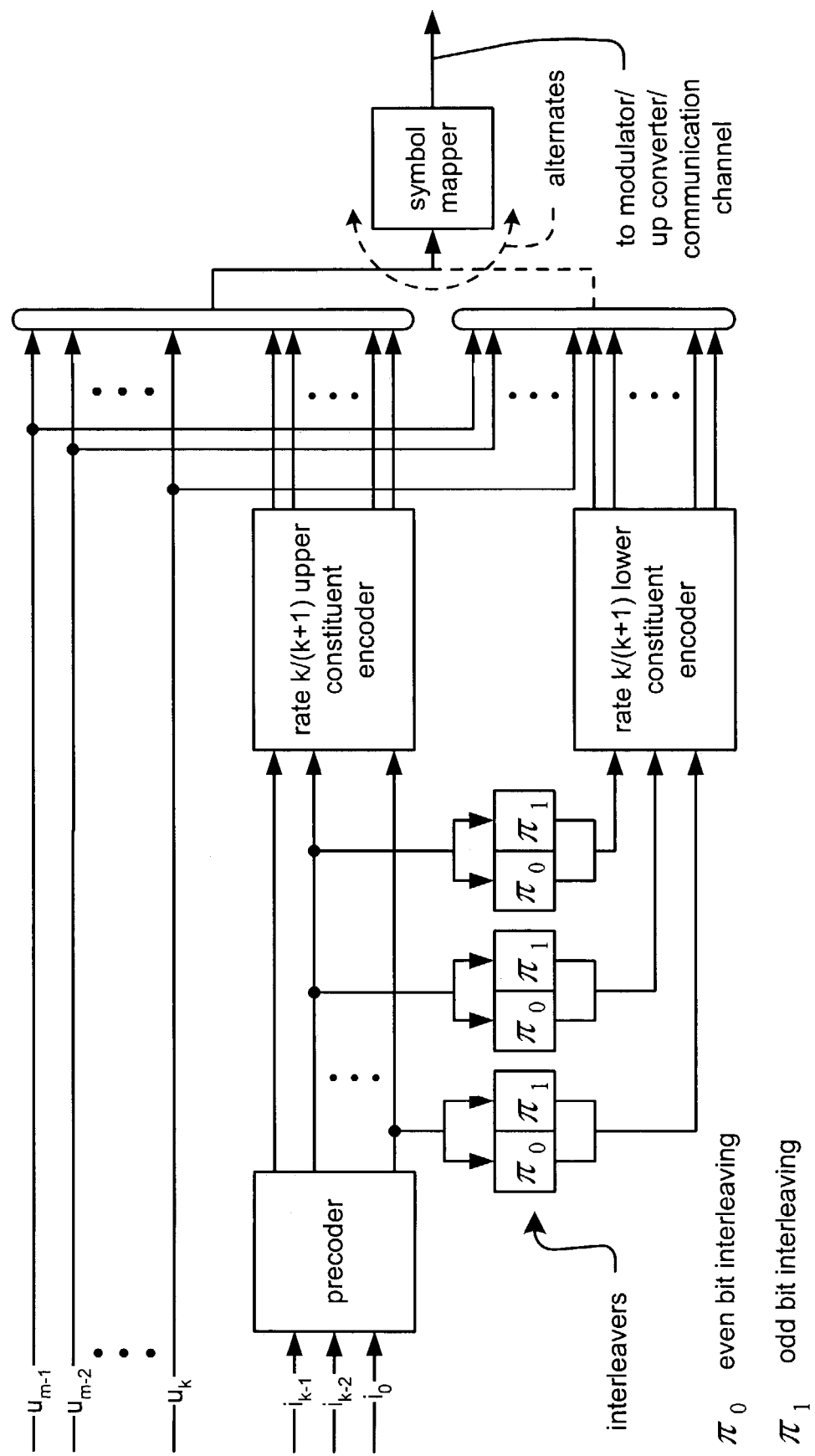
FIG. 11 is a diagram illustrating an embodiment of a Turbo Trellis Coded Modulation (TTCM) encoder that is built according to the invention.

FIG. 11 is a diagram illustrating an embodiment of a Turbo Trellis Coded Modulation (TTCM) encoder that is built according to the invention. the TTCM encoder shown in this embodiment is operable to be code input bits at a code rate of k/k+1. For example, when 2 input bits are employed as an input symbol (then k=2), and the code rate of the TTCM encoder is k/k+1=2/3. Similarly, when 3 input bits are employed as an input symbol (then k=3), and the code rate of the TTCM encoder is k/k+1=3/4. Therefore for every two input bits, a 3 bit encoded symbol will be produced. In the context of the rotational invariance described herein, these 3 bit symbols are coded using an 8 PSK modulation (having an 8 PSK shaped constellation and a particular mapping of the constellation points contained therein). It is also noted that one ore more uncoded bits (shown as $u_{m-1}$, $u_{m-2}$, . . . , $u_k$) may be used to generate the outputs symbols from the TTCM encoder.

Input bits (shown as $i_{k-1}$, $i_{k-2}$, . . . , $i_0$) are provided initially to a precoder. The precoder performs precoding of the input bits to generate precoded bits. There are a number of ways in which the precoding may be performed, and one particular embodiment is described in more detail below in FIG. 12. These precoded bits are then provided simultaneously to a rate k/k+1 upper constituent encoder and also to interleavers. The rate k/k+1 upper constituent encoder may be implemented as a convolutional encoder. The interleaver is operable to perform even bit interleaving and odd bit interleaving on the precoded bits. That is to say, different interleaving is performed on the precoded bits, depending on their relative location within the precoded bit stream. This even bit interleaving and odd bit interleaving on the precoded bits is shown as $\pi_0$ (even bit interleaving) and $\pi_1$ (odd bit interleaving), respectively. The odd and even bit interleaving cycles may be associated with alternating clock cycles at which the TTCM encoder is operating. After having undergone either the even bit interleaving and odd bit interleaving, the appropriately interleaved precoded bits are then passed to a rate k/k+1 lower constituent encoder.

The rate k/k+1 upper constituent encoder outputs an upper plurality of encoded bits, and the rate k/k+1 lower constituent encoder outputs a lower plurality of encoded bits. Selected bits from the upper plurality of encoded bits and the lower plurality of encoded bits are selected, along with one or more uncoded bits, by a symbol mapper that is operable to perform modulation encoding of the selected bits. Bits are alternatively selected from the upper plurality of encoded bits and the lower plurality of encoded bits (as well as one or more uncoded bits) to form an 8 PSK symbol. These 8 PSK symbols are then provided to a modulator that may include a Digital to Analog Converter (DAC) that generates an analog signal that may be transmitted across a communication channel. This analog signal may be viewed as a baseband analog signal whose frequency varies at the rate of a baseband clock at which the TTCM encoder operates. This analog signal may also be up converted, in frequency, to a higher frequency for transmission across the communication channel. For example, the baseband analog signal may be converted up to an intermediate frequency (IF) for transmission across the communication channel, or to another frequency that corresponds to the bandwidth constraints of the communication channel.

The communication channel may be any of the various types of communication channels described within this specification. The TTCM encoder may be viewed as including a precoder and a modified turbo encoder, that employs Trellis Coded Modulation (TCM) encoding, in conjunction with the turbo encoding. The cooperative operation of the precoder and the TTCM encoder operate to provide rotational invariance of 8 PSK symbols that are mapped to the constellation points within the 8 PSK constellation according to the symbol mapper.

Figure 12:
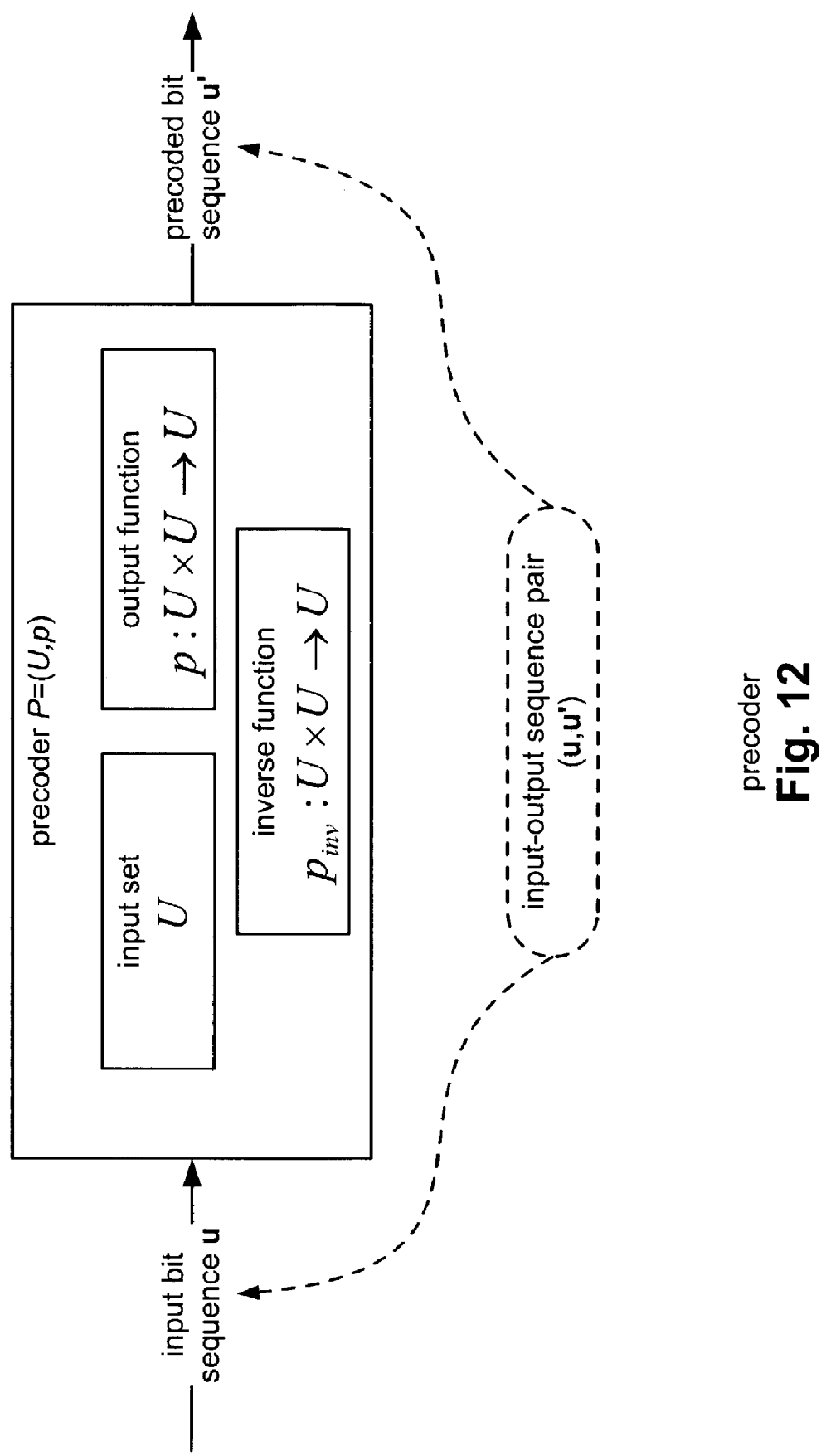
FIG. 12 is a diagram illustrating an embodiment of a precoder that is built according to the invention.

FIG. 12 is a diagram illustrating an embodiment of a precoder that is built according to the invention. The precoder shown in this embodiment may be viewed as being the precoder described above with respect to FIG. 11. This precoder may be defined as a precoder P=(U, p) having the following characteristics:

1) Input set U
2) Output function p: U×U→U
3) Inverse function $P_{inv}$:U×U→U, such that if $u'_1$=p($u_1$, $u'_0$) then $u_1$=$p_{inv}$($u'_1$,$u'_0$), and moreover $p_{inv}$(p($u_1$,v), p($u_2$, v))=p($u_1$,$U_2$) for all $u_1$,$u_2$, v∈U For example, let U={0, 1, 2, 3 } and define p(u, v)=u+v (mod 4) and $p_{inv}$(u,v)=(u−v)(mod 4), then P=(U, p) is a precoder. An input-output sequence pair (u, u') is admissible in the precoder P if $u_k$=$p_{inv}$($u'_k$, $u'_{k-1}$) for all k. The operation of the precoder may be represented as follows: P(u)=u'. That is to say, for an input bit sequence, u, then the precoder will generate a precoded bit sequence, u'.

Figure 13:
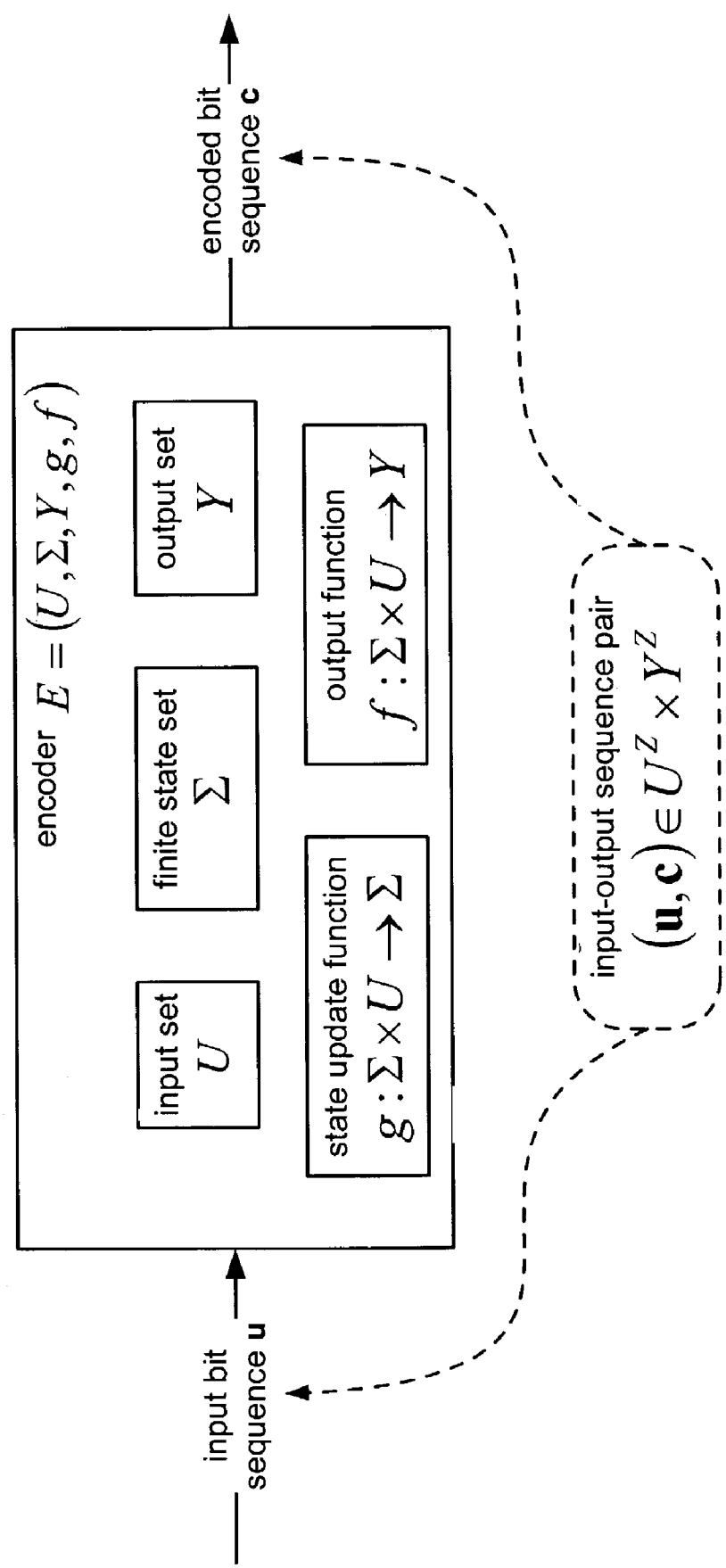
FIG. 13 is a diagram illustrating an embodiment of a convolutional encoder (that may be implemented as a constituent encoder) that is built according to the invention.

FIG. 13 is a diagram illustrating an embodiment of a convolutional encoder (that may be implemented as a constituent encoder) that is built according to the invention. The convolutional encoder shown in this embodiment may be viewed as being either the rate k/k+1 upper constituent encoder or the rate k/k+1 lower constituent encoder described above with respect to FIG. 11.

This convolutional encoder may be defined as an encoder E=(U, Σ, Y, g, ƒ) having the following characteristics:
1) Input set U
2) Finite state set Σ
3) Output set Y, signal constellation
4) State update function g : Σ×U→Σ
5) Output function ƒ: Σ×U→Y An input-output sequence pair $(u,c) \in U^Z \times U^Z$ is admissible in this convolutional encoder, E, if there exists a state sequence $\sigma = (\ldots, \sigma_k, \ldots) \in \Sigma^Z$ such that $\sigma_{k+1} = g(\sigma_k, u_k)$ and $c_k = f(u_k, \sigma_k)$ for all $k \in Z$.

This convolutional encoder includes the combination of a trellis T and a set partitioning map $\beta$. In fact, a trellis T can be defined as a finite subset of $\Sigma \times U \times V \times \Sigma$, where $\Sigma$ is a finite state set, U is an input set and V is an output set. An element of the trellis is called branch. One of these branches of trellis may be denoted by $(\sigma_s, u, v, \sigma_e)$ where $\sigma_s$ and $\sigma_e$ are start-state and end-state, respectively. In addition, u is input of the convolutional encoder, and v is an output of the convolutional encoder. The set partitioning map $\beta$ is from V to a constellation set Y. Then the encoder functions can be defined as follows:

1) State update function g: $g(\sigma, u) = \sigma'$ if there exists $v \in V$ such that $(\sigma, u, v, \sigma') \in T$ 2) Output function $f$: $f(\sigma, u) = \beta(v)$ where $(\sigma, u, v, \sigma') \in T$ for some state $\sigma'$.

This convolutional encoder may be denoted as being an encoder with transfer function of $E_{T,\beta} = (U, \Sigma, Y, g, f)$; this may be referred to as an encoder generated by the trellis T and the set partitioning map $\beta$.

Figure 14:
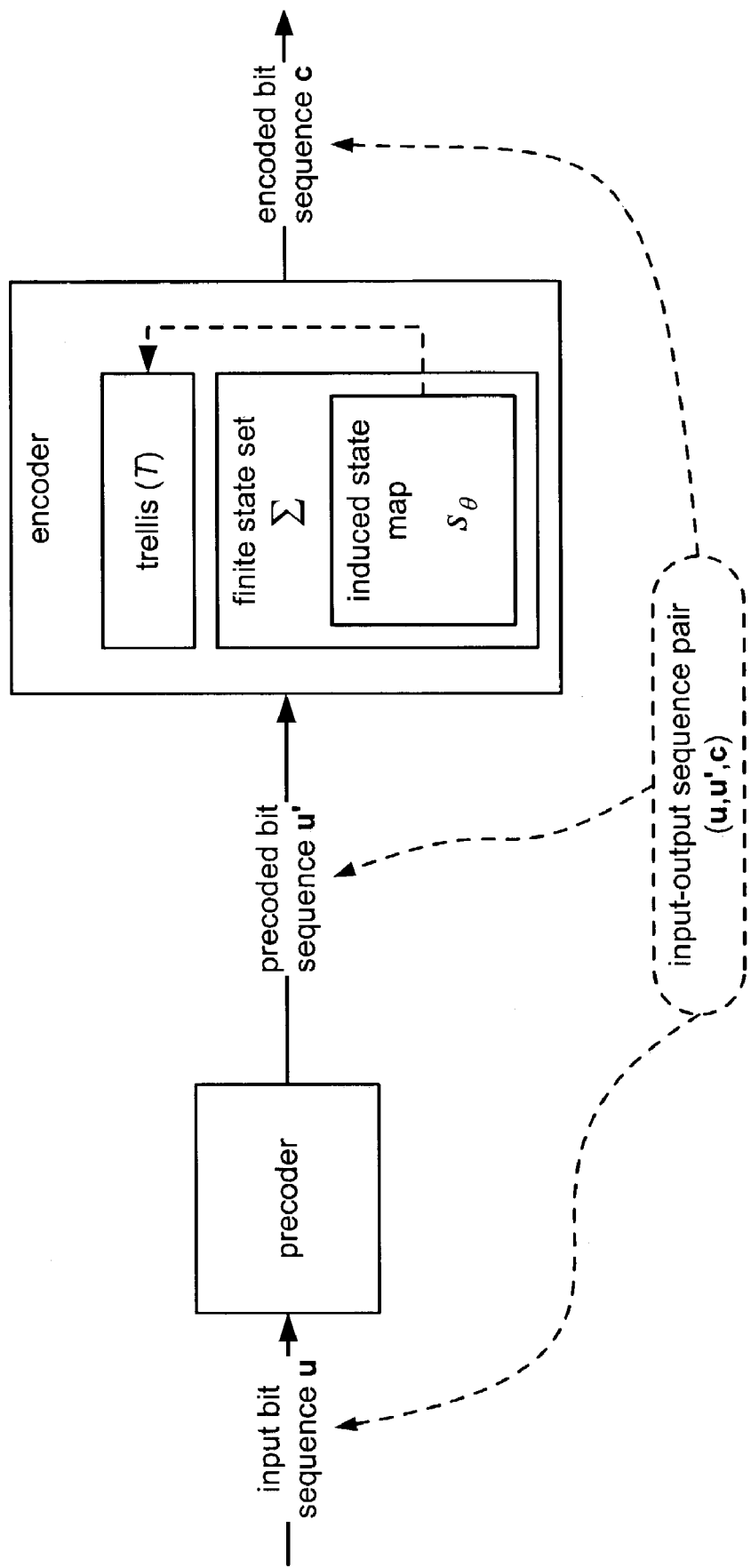
FIG. 14 is a diagram illustrating embodiment of rotationally invariant combined precoder and encoder that are arranged according to the invention.

FIG. 14 is a diagram illustrating embodiment of rotationally invariant combined precoder and encoder that are arranged according to the invention. The combination precoder and encoder described in this embodiment may be viewed as the combining of the precoder of the FIG. 12 and the convolutional encoder of the FIG. 13. More specifically, given a precoder P and an encoder E, the combination of them may be represented as (P, E). Therefore, a sequence triple (u, u', c) is admissible in the combined precoder/encoder (P,E) if (u, u') is admissible in the precoder P and (u, c) is admissible in the encoder E. That is to say, for an input bit sequence, u, then the precoder will generate a precoded bit sequence, u', and the encoder will generate a precoded bit sequence, c, there from. The operation of the precoding and the encoding, operating cooperatively to provide rotational invariance of 8 PSK symbols that are mapped to the constellation points within an 8 PSK constellation, is described in detail here.

A rotation in the constellation Y may be represented as $\theta$. More specifically, this rotation, may be viewed as being a rotation in an 8 PSK constellation Y. using this notation, the $\theta(c) = (\ldots \theta(c_k) \ldots)$. The notation of $\Theta = \langle \theta \rangle$ may be represented as the rotation group generated by the rotation $\theta$ of the constellation Y. In this, it is noted that only encoders that satisfy the cardinality of input set U of E that satisfies $|U| = |\Theta|$ are considered in this embodiment.

The input set U may be denoted by $U = \{u^{(1)}, u^{(2)}, \ldots, u^{(m)}\}$. From the rotation $\theta$, an induced precoder map $p_\theta$ may be defined such that by defining $\theta(u) = p_\theta(u, u^{(1)})$ we have the following relationship:

$$\theta^2(u) = p_\theta(p_\theta(u, u^{(1)}), u^{(1)}) = p_\theta(u, u^{(2)}) \text{ and } \theta^i(u) = p_\theta(u, u^{(i)}).$$

An induced precoder, including any accommodation of a rotation in the constellation Y may be represented as $\theta$, may be represented by the induced precoder by $P_\theta$. A precoder and encoder combination that includes the induced mapping to compensate for any rotation in the constellation Y may be represented as $\theta$ may be defined as $(P_\theta, E)$, and this rotationally invariant combined precoder and encoder is $\theta$ invariant for any admissible sequence triple (u, u', c) for which a rotated sequence triple $(u, \theta(u), \theta(c))$ is also admissible in the combined precoder and encoder.

In the following, the manner is described in which a rotationally invariant (or $\theta$ invariant) combined precoder and encoder may be generated using a trellis and a set partition map.

Initially, a design tool or design criterion is stated that is used to direct the design of a rotationally invariant combined precoder and encoder. If there exists an induced state map $s_\theta$ on the set of states $\Sigma$ such that $(s_\theta(\sigma_s), \theta(u), \theta(c), s_\theta(\sigma_e))$ is a branch in the trellis T for every trellis branch $(\sigma_s, u, v, \sigma_e)$, then the combined precoder and encoder $(P_\theta, E_{T,\beta})$ is rotationally invariant (or $\theta$ invariant). That is to say, the trellis may be designed such that an induced state map, that accommodates any rotation $\theta$ (within the set $\Theta$)) in the constellation Y, may be generated for each and every branch of a trellis, then the combined precoder and encoder may be designed such that it is rotationally invariant (or $\Theta$ invariant).

A very brief description is provided here to show how this design tool or design criterion operates. This process may begin by looking at (u, u', c) as being an admissible sequence triple in a combined precoder and encoder that is rotationally invariant (P, $E_{T,\beta}$). This then indicates that (u',c) is an admissible sequence in the encoder $E_{T,\beta}$. Therefore, for every $u'_k, c_k$, there then exist two states $\sigma_k$ and $\sigma_{k+1}$ such that $(\sigma_k, u'_k, c_k, \sigma_{k+1})$ is in fact a branch of the trellis employed. In addition, it is assumed that $(s_\theta(\sigma_k), \theta(u'_k), \theta(c_k), s_\theta(\sigma_{+1}))$ is also a branch that corresponds to this trellis as well. This then indicates that $(\theta(u'), \theta(c))$ is also admissible in the encoder $E_{T,\beta}$. A second order bit sequence, that accommodates any rotation $\theta$ in the constellation Y, may be denoted as $u'' = \theta(u')$. It may then be shown that the bit sequence (u, u'') is also admissible in a precoder $P_\theta$. This may be more clearly understood by considering $p_{inv}(u''_k, u''_{k-1})$. Therefore, for any k, the following relationship may be made:

$$p_{inv}(u''_k, u''_{k-1}) = p_{inv}(p_\theta(u'_k, u^{(1)}), p_\theta(u'_{k-1}, u^{(1)})) = p_{inv}(u'_k, u'_{k-1}) = u_k,$$

since (u, u') is admissible. Therefore, the bit sequence (u, u'') is also admissible. It therefore follows that the bit sequence, (u, $\theta(u')$, $\theta(c)$) (that accommodates any rotation $\theta$ in the constellation Y), is also admissible in a combined precoder and encoder $(P_\theta, E_{T,\beta})$.

This embodiment shows how a rotationally invariant combined precoder and encoder may be designed that can accommodate any rotation $\theta$ in the constellation Y. An induced mapping of a trellis employed within TTCM coding as well an induced mapping of the constellation employed within modulation encoding (e.g., an induced mapping of an 8 PSK modulation that employs an 8 PSK shaped constellation) may be designed according to the invention to ensure rotational invariance of the symbols thereof.

Figure 15:
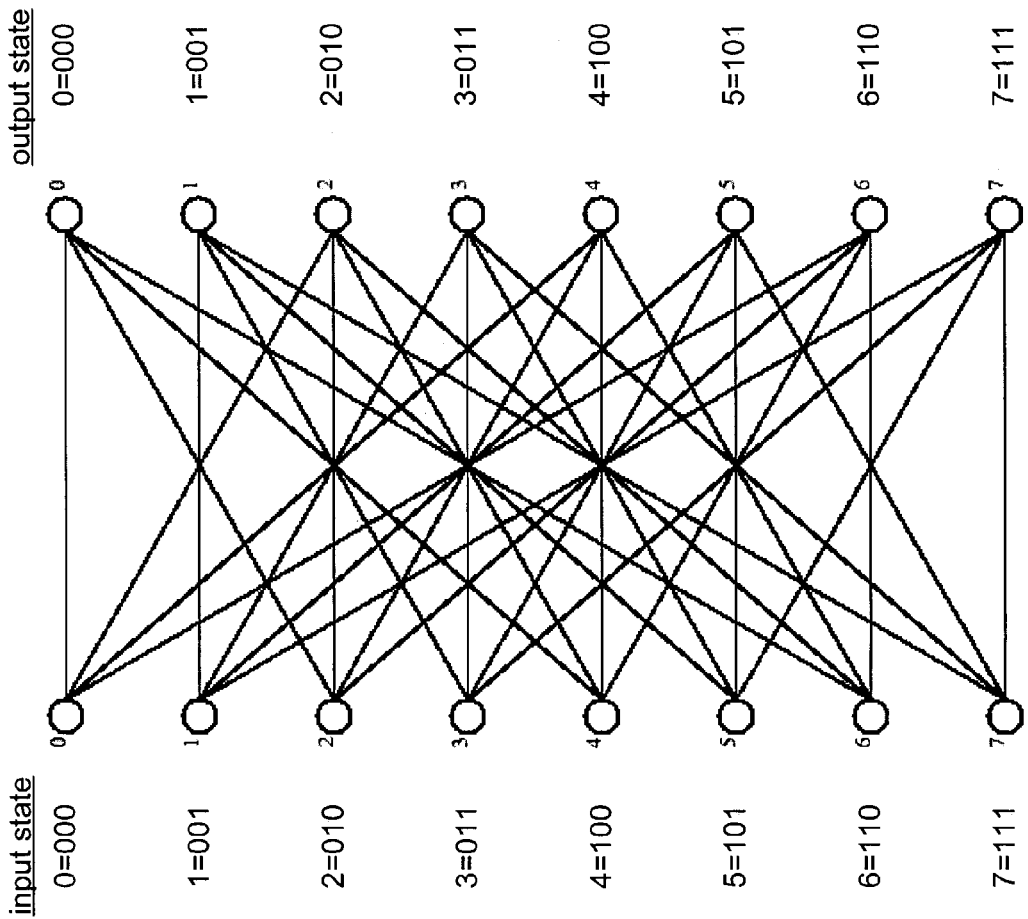
FIG. 15 is a diagram illustrating embodiment of a $1^{st}$ design attempt of a rotationally invariant trellis (that turns out not to be recursive) according to the invention.

FIG. 15 is a diagram illustrating embodiment of a $1^{st}$ design attempt of a rotationally invariant trellis (that turns out not to be recursive) according to the invention. This embodiment shows a trellis that may be chosen, in a $1^{st}$ design attempt, to ensure rotational invariance. It is also shown how this trellis does not, however, result in a recursive code. However, this process shows how the design process may be approached in accordance with the invention.

This trellis shown here is a based upon the design of a 90 degree (90°) rotationally invariant code, having a code rate of $\frac{2}{3}$, Turbo Trellis Coded Modulation (TTCM) code that employs an 8 state trellis that operates on two coded bits. Given a trellis shape and a set partition, the design principle described above may be followed to construct a rotationally invariant TTCM code. However, it is also noted that an initial design of a TTCM code may not in fact be convergent, or it may have very poor performance. In fact, the initial design may result in a TTCM code that may not satisfy the other certain conditions that a TTCM code needs. In such instances, a modification of the TTCM code, while still ensuring that rotational invariance is supported, is performed before arriving at a final design solution.

Some of the characteristics of a good design of a TTCM code, the trellis employed in it, and the set partitioning may be described as follows:

1) The subsets assigned to the same originating state or to the same terminating state must have the largest possible distance.

2) All the transitions that diverge from a common state or reemerge into a same state must be assigned with signals from one subset at the first level of set partitioning.

3) The encoder should be recursive.

Therefore, using these design constraints and the rotationally invariant criteria provided above, a 90 degree (90°) rotationally invariant 8 state trellis and 8 PSK trellis may be designed that satisfies the first two characteristics of a good design of a TTCM code, the trellis employed in it, and the set partitioning. Such a trellis shape is shown in the FIG. 15.

Again, this 8 state trellis shape satisfies the conditions described above with respect to the design characteristics. However, this 8 state trellis shape does not satisfy the third condition described above; the encoder is not recursive.

Similarly state transitions of the encoder may be understood when the encoder begins at a different input state, and receives an input bit sequence, and transitions to a respective output state.

Again, however, this particular design results in a rotationally invariant encoder based on this trellis shape that is usually non-recursive (i.e., the encoder does not satisfy the rule 3 described above). Therefore the turbo code using such a constituent encoder (that employs this trellis design) will not have interleave gain; in other words, the design will not be convergent.

Therefore, in order to have a recursive encoder that will still support rotational invariance, one of the first two design rules needs to be sacrificed. Various design alternatives have shown that keeping the design rule 2) is more advantageous than keeping rule 1).

Several of the following embodiments describe a design of a 90° rotationally invariant rate, code rate ⅔ TTCM code that employs an 8 PSK constellation. This design is shown initially as beginning with an 8 PSK shaped constellation having a mapping.

Figure 16:
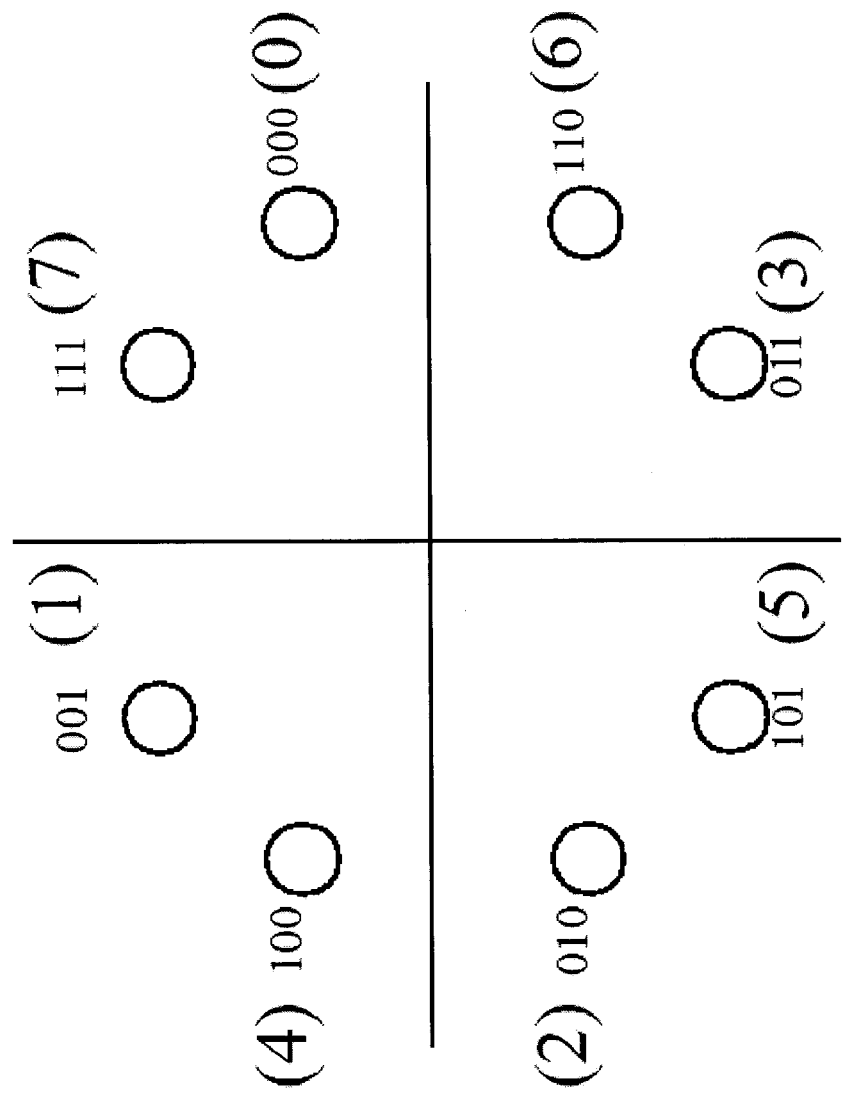
FIG. 16 is a diagram illustrating embodiment of mapping of an 8 PSK constellation according to the invention.

FIG. 16 is a diagram illustrating embodiment of mapping of an 8 PSK constellation according to the invention. The mapping of this 8 PSK constellation may be understood as follows: a 3 bit coded symbol having the bits of 000 and a value of 0 may be viewed as being mapped to the corresponding constellation point in the 8 PSK constellation in the upper right hand quadrant of the I,Q (In-phase, Quadrature) plane. Therefore, an analog baseband signal, when representing that particular valued symbol, will include the magnitude and phase of that particular constellation point at an appropriate point of time. A 90 degree (90°) rotation on this 8 PSK constellation may be described by the permutation (0123)(4567). Such a rotated constellation is then represented as follows: $\rho_{90}$. An appropriate shaped trellis is then shown below with respect to FIG. 17.

Figure 17:
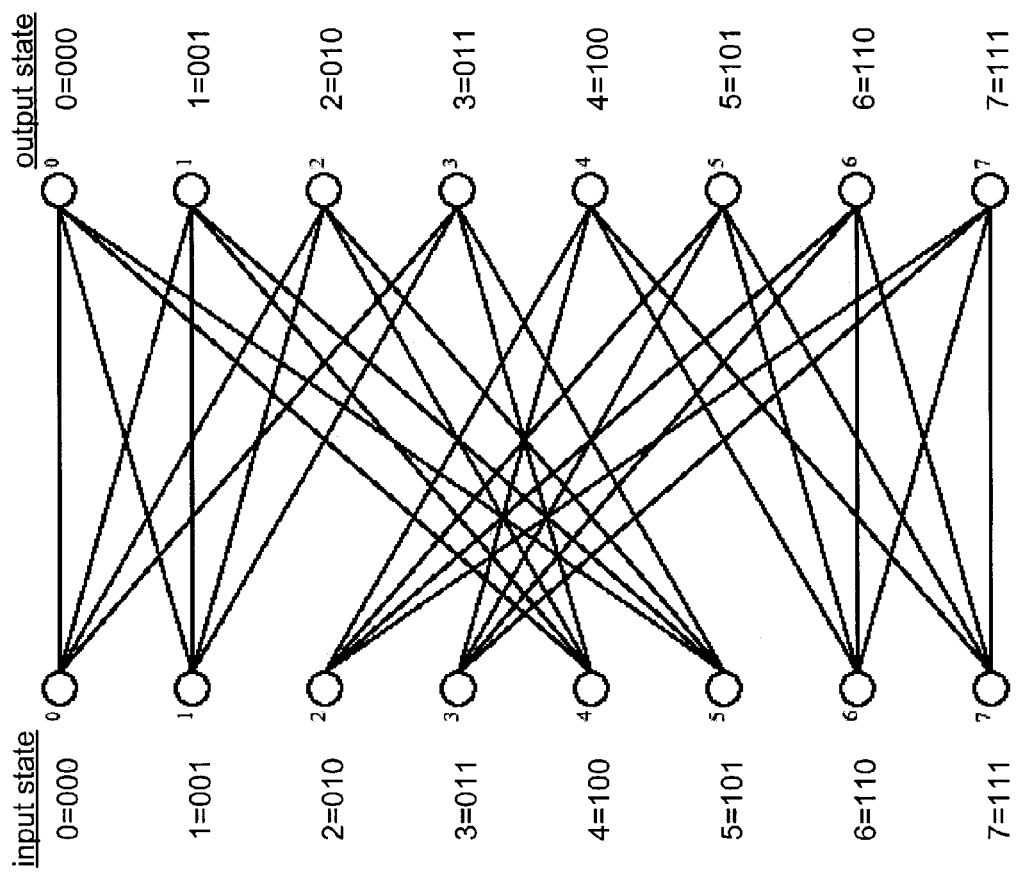
FIG. 17 is a diagram illustrating embodiment of a rotationally invariant trellis (including the induced permutation map of states therein) according to the invention.

FIG. 17 is a diagram illustrating embodiment of a rotationally invariant trellis (including the induced permutation map of states therein) according to the invention. This trellis design here in FIG. 17 is different than the trellis described above in FIG. 15 with respect to the initial design.

Therefore, using this trellis described with respect to FIG. 17, the induced permutation map of the states is then $s_{90}=(0617)(2534)$. Based on this induced permutation map, a similarly shaped trellis may then be designed as appropriately described below.

Figure 18:
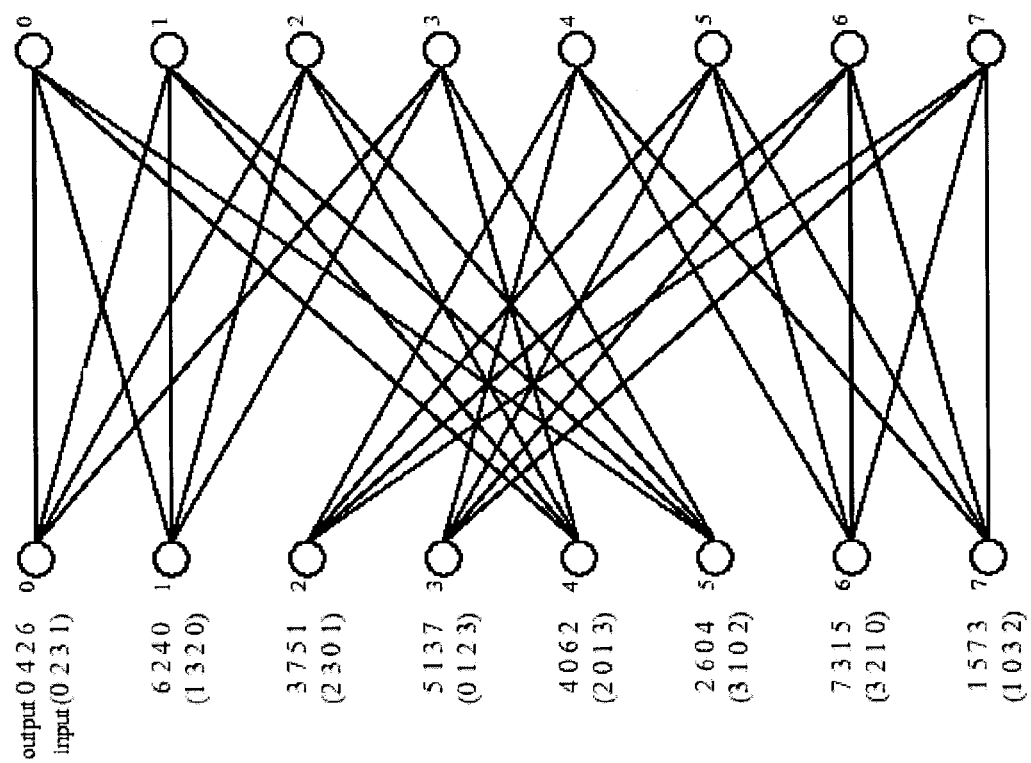
FIG. 18 is a diagram illustrating embodiment of the rotationally invariant trellis of the FIG. 17 (showing the appropriately modified mapping) according to the invention.

FIG. 18 is a diagram illustrating embodiment of the rotationally invariant trellis of the FIG. 17 (showing the appropriately modified mapping) according to the invention. Again, this trellis in FIG. 18 is similar in shape to the trellis of FIG. 17 with the exception of the different mapping shown therein.

For example, the following trellis of FIG. 18 then supports the appropriately modified mapping that will support rotational invariance in the context of the TTCM code described herein.

The operation of the 8 state trellis of the FIG. 18, with the appropriately modified mapping, may then be described as follows when beginning from the state of 0=000.

When the encoder is in the state 0=000, and when the 2 bit input sequence 00=0 is provided, then the state of the encoder will transition from the input state 0=000 to the output state 0=000. This may be viewed as the state of the encoder transitioning along the $1^{st}$ possible branch of the trellis extending from the input state 0=000; this branch may be viewed as being indexed by the 2 bit input sequence 00=0.

That is to say: when starting from the input state 0=000, and when receiving as input the 2 bit input sequence 00=0, the encoder will transition to output state 0=000, and a 3 bit, coded 8 PSK output symbol is generated by the encoder having a value of 0=000.

When the encoder is in the state 0=000, and when the 2 bit input sequence 10=2 is provided, then the state of the encoder will transition from the input state 0=000 to the output state 1=001. This may be viewed as the state of the encoder transitioning along the $2^{nd}$ possible branch of the trellis extending from the input state 0=000; this branch may be viewed as being indexed by the 2 bit input sequence 10=2.

Moreover, when starting from the input state 0=000, and when receiving as input the 2 bit input sequence 10=2, the encoder will transition to output state 1=001, and a 3 bit, coded 8 PSK output symbol is generated by the encoder having a value of 4=100.

When the encoder is in the state 0=000, and when the 2 bit input sequence 11=3 is provided, then the state of the encoder will transition from the input state 0=000 to the output state 2=010. This may be viewed as the state of the encoder transitioning along the $3^{rd}$ possible branch of the trellis extending from the input state 0=000; this branch may be viewed as being indexed by the 2 bit input sequence 11=3.

Moreover, when starting from the input state 0=000, and when receiving as input the 2 bit input sequence 11=3, the encoder will transition to output state 2=010, and a 3 bit, coded 8 PSK output symbol is generated by the encoder having a value of 2=010.

When the encoder is in the state 0=000, and when the 2 bit input sequence 01=1 is provided, then the state of the encoder will transition from the input state 0=000 to the output state 3=011. This may be viewed as the state of the encoder transitioning along the $4^{th}$ possible branch of the trellis extending from the input state 0=000; this branch may be viewed as being indexed by the 2 bit input sequence 01=1.

Moreover, when starting from the input state 0=000, and when receiving as input the 2 bit input sequence 01=1, the encoder will transition to output state 3=011, and a 3 bit, coded 8 PSK output symbol is generated by the encoder having a value of 6=110.

Some additional comments are provided here with respect to the trellis designed and shown within the FIG. 18. Obviously, the encoder supported by this trellis in the FIG. 18 is not systematic. An appropriate induced precoder mapping that corresponds to and supports rotational invariance of an 8 PSK constellation mapping is then designed. The precoder may be designed as follows:

A precoder is initially defined. First, a precoder mapping v may be designed on $\{0,1,2,3\}$ such that $v(0)=0$; $v(1)=1$; $v(2)=3$; $v(3)=2$ (it has the inverse $v^{-1}$). Therefore, the induced precoder map $p_{90}$, support rotational invariance for a 90 degree rotation, may then be defined as follows:

$p_{90}(u_1,u_2)=v^{-1}(v(u_1)+v(u_2)(\mathrm{mod}\ 4))$, and $p_{inv}(u_1,u_2)=v^{-1}(v(u_1)-v(u_2)(\mathrm{mod}4))$, where $u_1,u_2 \in \{0,1,2,3\}(=\{00,01,10,11\})$.

This induced precoder mapping that corresponds to the approximate 90 degree rotation of the 8 PSK constellation mapping (as shown in Table 1. $p_{90}$), as well as its inverse (shown in Table 2. $p_{inv}$) may be described also in table format as follows:

TABLE 1

$p_{90}$

| input | 00 | 01 | 10 | 11 |
|---|---|---|---|---|
| 00 | 00 | 01 | 10 | 11 |
| 01 | 01 | 11 | 00 | 10 |
| 10 | 10 | 00 | 11 | 01 |
| 11 | 11 | 10 | 01 | 00 |

TABLE 2

$p_{inv}$

| input | 00 | 01 | 10 | 11 |
|---|---|---|---|---|
| 00 | 00 | 10 | 01 | 11 |
| 01 | 01 | 00 | 11 | 10 |
| 10 | 10 | 11 | 00 | 01 |
| 11 | 11 | 01 | 10 | 00 |

Figure 19:
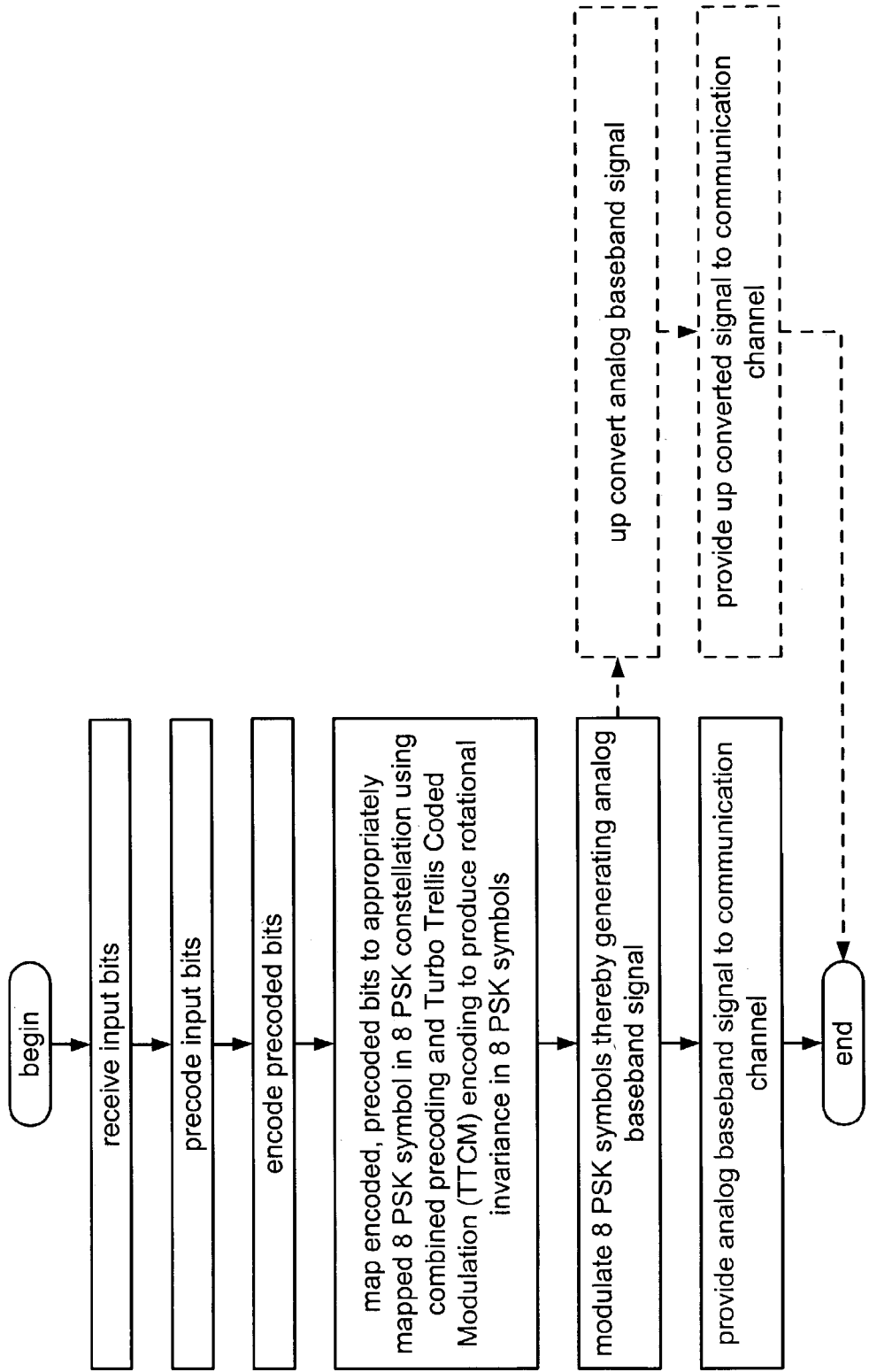
FIG. 19, FIG. 20, and FIG. 21 are flowcharts illustrating embodiments of 8 PSK rotationally invariant encoding methods that are performed according to the invention.
Figure 20:
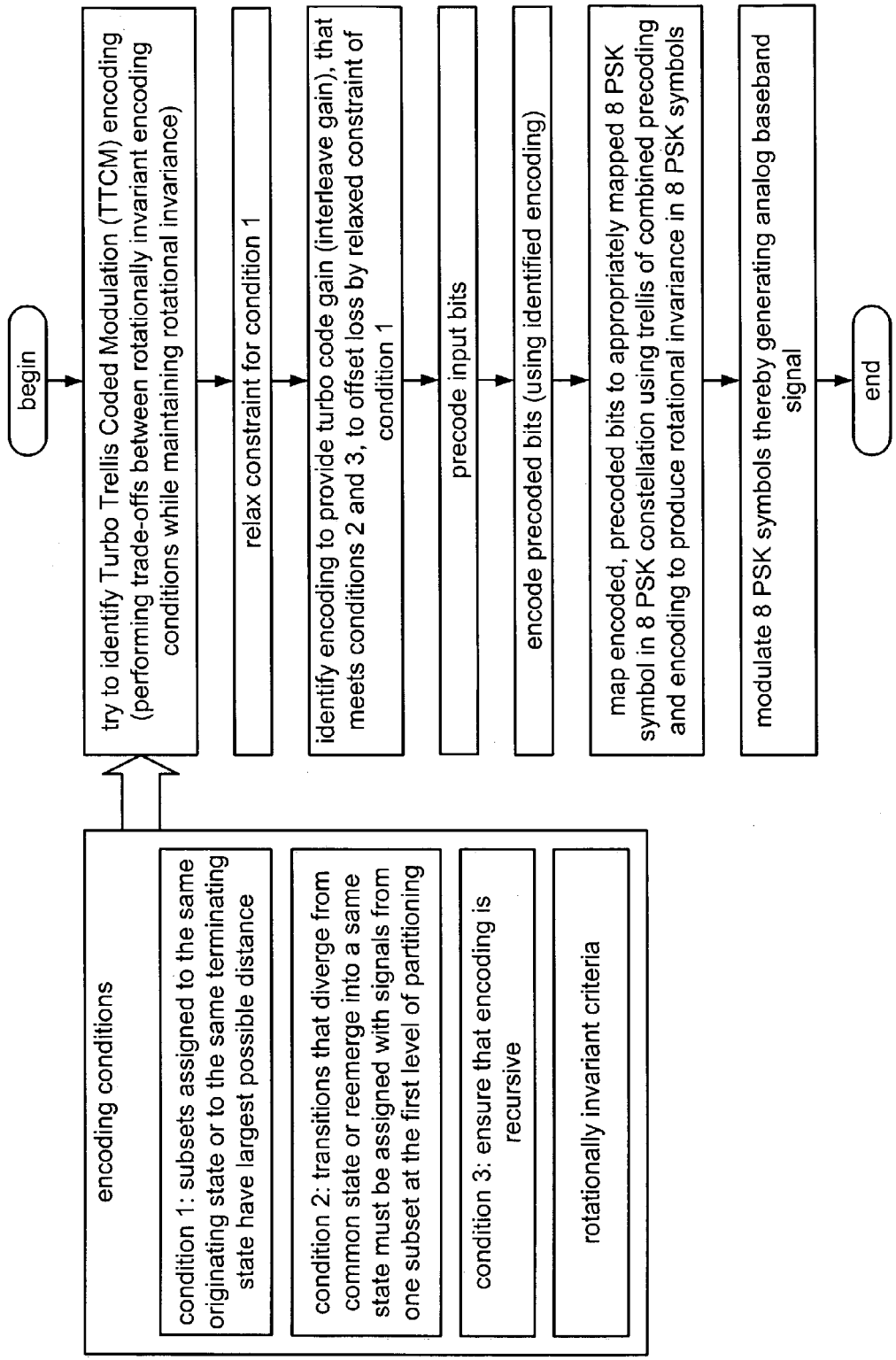
Figure 21:
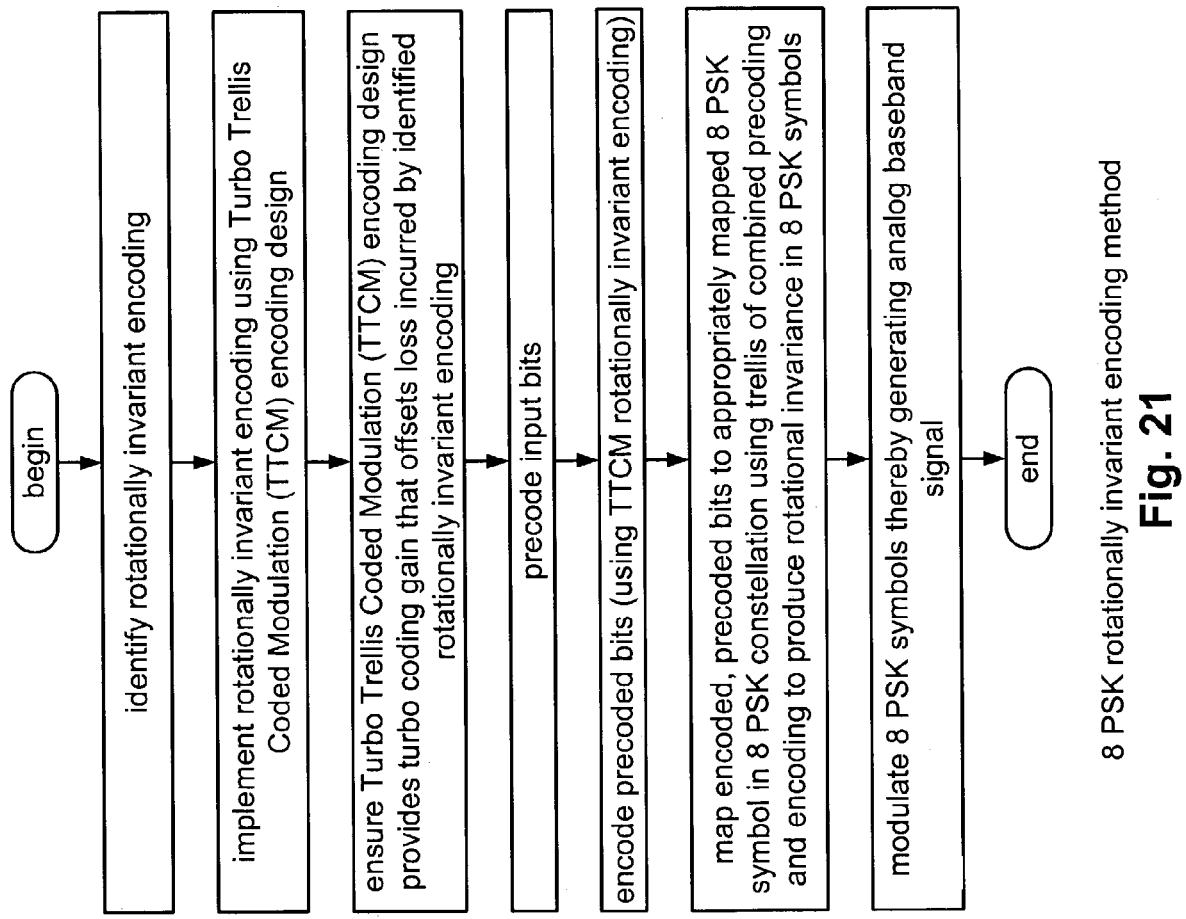

FIG. 19, FIG. 20, and FIG. 21 are flowcharts illustrating embodiments of 8 PSK rotationally invariant encoding methods that are performed according to the invention.

Referring to the FIG. 19, one embodiment of an 8 PSK rotationally invariant encoding method is shown. Initially, input bits are received. Then, these input bits are precoded to generate precoded bits. These precoded bits are then encoded to generate encoded bits. Then, these encoded bits are grouped to form 3 bits symbols which are then mapped to an appropriately mapped 8 PSK symbol in an 8 PSK constellation according to the combined preceding and Turbo Trellis Coded Modulation (TTCM) encoding to produce rotational invariance in the 8 PSK symbols.

These rotationally invariant 8 PSK symbols, initially in digital format, are then modulated to generate an analog baseband signal. A Digital to Analog Converter (DAC) may be employed to generate the analog baseband signal. This analog baseband signal may then be provided to a communication channel. The analog baseband signal may be transmitted to a communication receiver via the communication channel.

In certain embodiments, the analog baseband signal may also be up converted to another frequency that is more appropriate for transmitting a signal via the communication channel. This up converted signal may then be provided to a communication channel.

Referring to the FIG. 20, another embodiment of an 8 PSK rotationally invariant encoding method is shown. Initially, an attempt is made to try to identify a Turbo Trellis Coded Modulation (TTCM) code that can result in rotational invariance of symbols generated thereby.

When searching for this TTCM code, three (3) encoding conditions (as well as the rotationally invariant criteria) are considered. These three (3) conditions may be described as follows:

1) The subsets assigned to the same originating state or to the same terminating state must have the largest possible distance.

2) All the transitions that diverge from a common state or reemerge into a same state must be assigned with signals from one subset at the first level of set partitioning.

3) The encoder should be recursive.

In addition, the rotationally invariant criteria described above with respect to other embodiments must also be considered when searching for this TTCM code.

Then, after a design of a trellis is made, if the original design attempt does not arrive at a complete solution, then at least one constraint of the design conditions may be relaxed. In this embodiment, the constraint for the condition 1) is relaxed. That is to say, the constraint that subsets assigned to the same originating state or to the same terminating state have the largest possible distance is relaxed.

Thereafter, an encoding is then identified to provide for a turbo code gain (sometimes referred to as an interleave gain), using a TTCM code, that meets the conditions 2) and 3) which offsets any signal loss incurred by the relaxed constraint of condition 1). Then, once an appropriate TTCM code is identified, and a corresponding precode approach is also identified, then input bits are precoded using that preceding to generate precoded bits. Then, those precoded bits undergo the identified TTCM encoding to generate encoded bits.

Afterwards, these encoded bits are grouped to form 3 bits symbols which are then mapped to an appropriately mapped 8 PSK symbol in an 8 PSK constellation according to the combined precoding and Turbo Trellis Coded Modulation (TTCM) encoding to produce rotational invariance in the 8 PSK symbols.

These rotationally invariant 8 PSK symbols, initially in digital format, are then modulated to generate an analog baseband signal. Again, a DAC may be employed to generate the analog baseband signal. As described also with the other embodiments described above. This analog baseband signal (or an up converted version thereof) may then be provided to a communication channel. This signal may be transmitted to a communication receiver via the communication channel.

Referring to the FIG. 21, another embodiment of an 8 PSK rotationally invariant encoding method is shown. In this embodiment, a rotationally invariant encoding is initially identified. Then, this rotationally invariant encoding is implemented using a Turbo Trellis Coded Modulation (TTCM) encoding design. This TTCM encoding design, along with a corresponding precoding approach, operate to provide rotational invariance of the 8 PSK symbols. However, in doing so, a certain degree of coding loss is incurred. The TTCM encoding provides a turbo code gain that offsets the coding loss that is incurred by ensuring the rotationally invariant of the 8 PSK symbols.

Once this appropriate TTCM code is identified, and a corresponding precode approach is also identified, then input bits are precoded using that precoding to generate precoded bits. Then, those precoded bits undergo the identified TTCM encoding to generate encoded bits. Again, the preceding and the TTCM encoding operate cooperatively to provide rotational invariance of the 8 PSK symbols within the plurality of 8 PSK symbols.

Afterwards, these encoded bits are grouped to form 3 bits symbols which are then mapped to an appropriately mapped 8 PSK symbol in an 8 PSK constellation according to the combined preceding and Turbo Trellis Coded Modulation (TTCM) encoding to produce rotational invariance in the 8 PSK symbols.

These rotationally invariant 8 PSK symbols, initially in digital format, are then modulated to generate an analog baseband signal. Again, a DAC may be employed to generate the analog baseband signal. As described also with the other embodiments described above. This analog baseband signal (or an up converted version thereof) may then be provided to a communication channel. This signal may be transmitted to a communication receiver via the communication channel.

It is also noted that the methods described here within the FIG. 19, FIG. 20, and FIG. 21 may be performed within any of the various device embodiments described herein.

Figure 22:
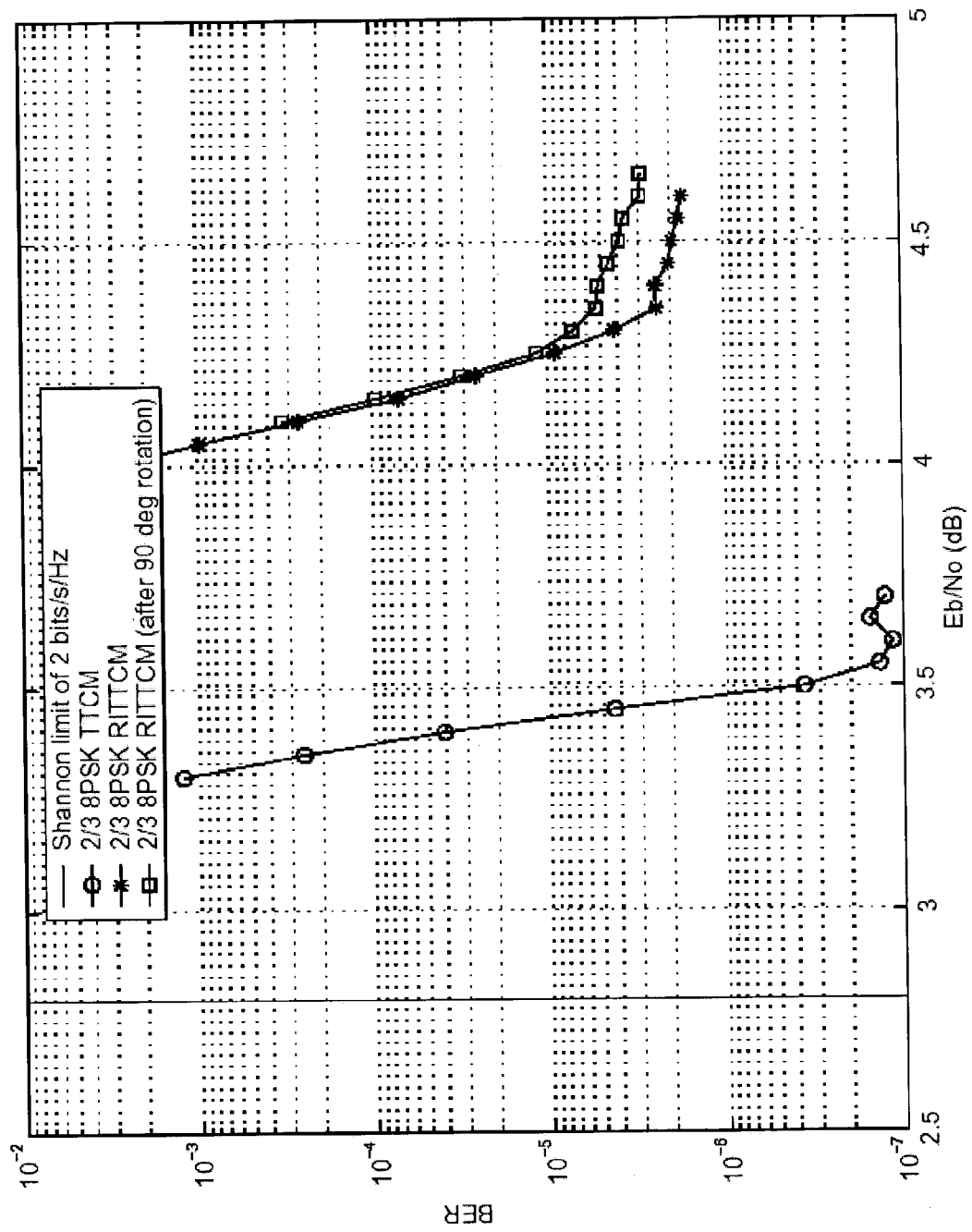
FIG. 22 is a diagram illustrating embodiment of performance of a 90 degree rotationally invariant 8 PSK TTCM with a ⅔ code rate according to the invention.

FIG. 22 is a diagram illustrating embodiment of performance of a 90 degree rotationally invariant 8 PSK TTCM with a ⅔ code rate according to the invention. These performance curves are described in the context of BER (Bit Error Rate) versus $E_b/N_o$ (ratio of energy per bit $E_b$ to the Spectral Noise Density $N_o$). This term $E_b/N_o$ is the measure of Signal to Noise (SNR) for a digital communication system.

The performance described in this embodiment may be viewed in the context of the Shannon limit of 2 bit/s/Hz (bit per second per Hertz). A ⅔ code rate TTCM code that performs encoding of 2 bit input symbols to generate 8 PSK encoded output symbols is explored here.

Initially, a ⅔ code rate TTCM code, that does not support rotational invariance, is shown as having a minimum $E_b/N_o$ of approximately 3.5 dB is achieved at a BER of approximately $10^{-5}$. When a ⅔ code rate TTCM code is designed to support the rotational invariance of the invention, a minimum $E_b/N_o$ of approximately 4.25 dB is achieved at a BER of approximately $10^{-5}$. The rotational invariance functionality of the invention, using the ⅔ code rate TTCM code that is designed to support the rotational invariance, incurs a performance degradation of approximately 0.75 dB when compared to the ⅔ code rate TTCM code, that does not support rotational invariance. Two separate performance curves are shown when employing the ⅔ code rate TTCM code that is designed to support the rotational invariance. One of the performance curves operates on a constellation that has not been rotated at all, and the other performance curve operates on a constellation that has been rotated by 90 degrees. As can be seen, both of the performance curves have a minimum $E_b/N_o$ of approximately 4.25 dB at a BER of approximately $10^{-5}$.

While it is clear that a coding loss is in fact introduced by ensuring the rotational invariance of the 8 PSK symbols generated using the combined preceding and encoding of the invention, the coding loss would be significantly greater were it not for a turbo code gain that offsets the coding loss. This turbo code gain is achieved using the TTCM encoding according to the invention. While there is a quantifiable degradation in performance, the invention does nevertheless provide for a means by which a 90 degree rotation of an 8 PSK constellation may be accommodated while still providing for very high performance.

In view of the above detailed description of the invention and associated drawings, other modifications and variations will now become apparent. It should also be apparent that such other modifications and variations may be effected without departing from the spirit and scope of the invention.

What is claimed is:

1. An 8 PSK (Phase Shift Keying) rotationally invariant encoding method, the method comprising:
   receiving a plurality of input bits;
   precoding the plurality of input bits thereby generating a plurality of precoded bits;
   encoding the plurality of precoding bits using Turbo Trellis Coded Modulation (TTCM) encoding thereby generating a plurality of encoded bits;
   selectively grouping encoded bits of the plurality of encoded bits into a plurality of 8 PSK symbols;
   mapping each 8 PSK symbol of the plurality of 8 PSK symbols to a corresponding constellation point within an 8 PSK constellation having an 8 PSK constellation mapping and a permutation that describes a 90 degree rotation of the 8 PSK constellation mapping; and
   generating an analog baseband signal whose I,Q (In-phase, Quadrature) components correspond to the mappings of the 8 PSK symbols to the constellation points within the 8 PSK constellation; and wherein:
   the precoding and the encoding operate cooperatively to provide rotational invariance of the 8 PSK symbols within the plurality of 8 PSK symbols that are mapped to the constellation points within the 8 PSK constellation; and
   the TTCM encoding employs a trellis whose state transitions via branch connectivity are governed by an induced permutation mapping of states of the trellis that accommodates the 90 degree rotation of the 8 PSK constellation mapping.

2. The method of claim 1, wherein:
   the TTCM encoding employs a finite state set whose states are mapped using an induced state mapping that accommodates the 90 degree rotation of the 8 PSK constellation mapping for each branch of the trellis.

3. The method of claim 1, wherein:
   the operation of the precoding and the encoding to provide rotational invariance of the 8 PSK symbols introduces a coding loss; and
   the TTCM encoding provides a turbo code gain that offsets the coding loss.

4. The method of claim 1, wherein the rotational invariance of the 8 PSK symbols is operable to accommodate a rotation of the 8 PSK constellation by 90 degrees in either of a clockwise direction or a counter-clockwise direction.

5. The method of claim 4, wherein the rotation of the 8 PSK constellation by 90 degrees is generated by a Carrier Frequency Offset (CEO) between a local oscillator in a communication transmitter and a local oscillator in a communication receiver.

6. The method of claim 1, wherein the precoding employs an induced precoder mapping that corresponds to the 90 degree rotation of the 8 PSK constellation mapping.

7. The method of claim 1, wherein the TTCM encoding performs even bit interleaving and odd bit interleaving on the plurality of precoded bits.

8. The method of claim 1, further comprising providing the analog baseband signal to a communication channel.

9. The method of claim 1, further comprising:
up converting a carrier frequency of the analog baseband signal thereby generating an up converted signal; and
providing the up converted signal to a communication channel.

10. The method of claim 1, wherein:
the method is performed within a communication transmitter; and
the communication transmitter is implemented within at least one of a satellite communication system, a High Definition Television (HDTV) communication system, a cellular communication system, a microwave communication system, a point-to-point communication system, a uni-directional communication system, a bi-directional communication system, and a one to many communication system.

11. An 8 PSK (Phase Shift Keying) rotationally invariant encoding method, the method comprising:
receiving a plurality of input bits;
precoding the plurality of input bits thereby generating a plurality of precoded bits;
encoding the plurality of precoded bits using Turbo Trellis Coded Modulation (TTCM) encoding to generate an upper plurality of encoded bits;
selectively performing even bit interleaving and odd bit interleaving on the plurality of precoded bits;
encoding the interleaved plurality of precoded bits using TTCM encoding to generate a lower plurality of encoded bits;
alternatively selecting encoded bits from the upper plurality of encoded bits and the lower plurality of encoded bits and selectively grouping the alternatively selected bits into a plurality of 8 PSK symbols;
mapping each 8 PSK symbol of the plurality of 8 PSK symbols to a corresponding constellation point within an 8 PSK constellation having an 8 PSK constellation mapping and a permutation that describes a 90 degree rotation of the 8 PSK constellation mapping;
generating an analog baseband signal whose I,Q (In-phase, Quadrature) components correspond to the mappings of the 8 PSK symbols to the constellation points within the 8 PSK constellation; and wherein:
the precoding and the encoding operate cooperatively to provide rotational invariance of the 8 PSK symbols within the plurality of 8 PSK symbols that are mapped to the constellation points within the 8 PSK constellation;
the rotational invariance of the 8 PSK symbols is operable to accommodate a rotation of the 8 PSK constellation by 90 degrees in either of a clockwise direction or a counter-clockwise direction;
the TTCM encoding employs a trellis whose state transitions via branch connectivity are governed by an induced permutation mapping of states of the trellis that accommodates the 90 degree rotation of the 8 PSK constellation mapping; and
the operation of the precoding and the encoding to provide rotational invariance of the 8 PSK symbols introduces a coding loss;
the TTCM encoding provides a turbo code gain that offsets the coding loss; and the precoding employs an induced precoder mapping that corresponds to the 90 degree rotation of the 8 PSK constellation mapping.

12. The method of claim 11, wherein:
the TTCM encoding employs a finite state set whose states are mapped using an induced state mapping that accommodates the 90 degree rotation of the 8 PSK constellation mapping for each branch of the trellis.

13. The method of claim 11, wherein the rotation of the 8 PSK constellation by 90 degrees is generated by a Carrier Frequency Offset (CFO) between a local oscillator in a communication transmitter and a local oscillator in a communication receiver.

14. The method of claim 11, further comprising providing the analog baseband signal to a communication channel.

15. The method of claim 11, further comprising:
up converting a carrier frequency of the analog baseband signal thereby generating an up converted signal; and
providing the up converted signal to a communication channel.

16. A communication transmitter, comprising:
a precoder that receives a plurality of input bits and precodes the plurality of input bits thereby generating a plurality of precoded bits;
an encoder that encodes the plurality of precoding bits using Turbo Trellis Coded Modulation (TTCM) encoding thereby generating a plurality of encoded bits;
a symbol mapper that selectively groups encoded bits of the plurality of encoded bits into a plurality of 8 PSK symbols and that maps each 8 PSK symbol of the plurality of 8 PSK symbols to a corresponding constellation point within an 8 PSK constellation having an 8 PSK constellation mapping and a permutation that describes a 90 degree rotation of the 8 PSK constellation mapping; and
a modulator that generates an analog baseband signal whose I,Q (In-phase, Quadrature) components correspond to the mappings of the 8 PSK symbols to the constellation points within the 8 PSK constellation; and wherein:
the precoder and the encoder operate cooperatively to provide rotational invariance of the 8 PSK symbols within the plurality of 8 PSK symbols that are mapped to the constellation points within the 8 PSK constellation; and
the TTCM encoding performed by the encoder employs a trellis whose state transitions via branch connectivity are governed by an induced permutation mapping of states of the trellis that accommodates the 90 degree rotation of the 8 PSK constellation mapping.

17. The communication transmitter of claim 16, wherein:
the TTCM encoding employs a finite state set whose states are mapped using an induced state mapping that accommodates the 90 degree rotation of the 8 PSK constellation mapping for each branch of the trellis.

18. The communication transmitter of claim 16, wherein:
the operation of the precoding and the encoding of the precoder and the encoder, respectively, to provide rotational invariance of the 8 PSK symbols introduces a coding loss; and
the TTCM encoding provides a turbo code gain that offsets the coding loss.

19. The communication transmitter of claim 16, wherein the rotational invariance of the 8 PSK symbols is operable to accommodate a rotation of the 8 PSK constellation by 90 degrees in either of a clockwise direction or a counter-clockwise direction.

20. The communication transmitter of claim 19, wherein the rotation of the 8 PSK constellation by 90 degrees is generated by a Carrier Frequency Offset (CFO) between a local oscillator in the communication transmitter and a local oscillator in a communication receiver.

21. The communication transmitter of claim 16, wherein the precoding of the precoder employs an induced precoder mapping that corresponds to the 90 degree rotation of the 8 PSK constellation mapping.

22. The communication transmitter of claim 16, wherein the encoder includes an interleaver that is operable to perform even bit interleaving and odd bit interleaving on the plurality of precoded bits.

23. The communication transmitter of claim 16, wherein the analog baseband signal is provided to a communication channel.

24. The communication transmitter of claim 16, wherein:
a carrier frequency of the analog baseband signal is up converted thereby generating an up converted signal; and
the up converted signal is provided to a communication channel.

25. The communication transmitter of claim 16, wherein the communication transmitter is implemented within at least one of a satellite communication system, a High Definition Television (HDTV) communication system, a cellular communication system, a microwave communication system, a point-to-point communication system, a uni-directional communication system, a bi-directional communication system, and a one to many communication system.

26. A communication transmitter, comprising:
a precoder that receives a plurality of input bits and precodes the plurality of input bits thereby generating a plurality of precoded bits;
an upper constituent encoder that encodes the plurality of precoded bits using Turbo Trellis Coded Modulation (TTCM) encoding thereby generating an upper plurality of encoded bits;
an interleaver that selectively performs even bit interleaving and odd bit interleaving on the plurality of precoded bits;
a lower constituent encoder that encodes the interleaved plurality of precoded bits using TTCM encoding thereby generating a lower plurality of encoded bits;
a symbol mapper that alternatively selects encoded bits from the upper plurality of encoded bits and the lower plurality of encoded bits and selectively groups the alternatively selected bits into a plurality of 8 PSK symbols;
wherein the symbol mapper also maps each 8 PSK symbol of the plurality of 8 PSK symbols to a corresponding constellation point within an 8 PSK constellation having an 8 PSK constellation mapping and a permutation that describes a 90 degree rotation of the 8 PSK constellation mapping;
a modulator that generates an analog baseband signal whose I,Q (In-phase, Quadrature) components correspond to the mappings of the 8 PSK symbols to the constellation points within the 8 PSK constellation; and
wherein:
the precoder and the encoder operate cooperatively to provide rotational invariance of the 8 PSK symbols within the plurality of 8 PSK symbols that are mapped to the constellation points within the 8 PSK constellation; and
the TTCM encoding employs a trellis whose state transitions via branch connectivity are governed by an induced permutation mapping of states of the trellis that accommodates the 90 degree rotation of the 8 PSK constellation mapping;
the operation of the precoding and the encoding of the precoder and the encoder, respectively, that provide rotational invariance of the 8 PSK symbols introduces a coding loss;
the TTCM encoding provides a turbo code gain that offsets the coding loss; and
the precoding employs an induced precoder mapping that corresponds to the 90 degree rotation of the 8 PSK constellation mapping.

27. The communication transmitter of claim 26, wherein:
the rotational invariance of the 8 PSK symbols is operable to accommodate a rotation of the 8 PSK constellation by 90 degrees in either of a clockwise direction or a counter-clockwise direction;
the rotation of the 8 PSK constellation by 90 degrees is generated by a Carrier Frequency Offset (CFO) between a local oscillator in the communication transmitter and a local oscillator in a communication receiver.

28. The communication transmitter of claim 26, wherein:
the TTCM encoding employs a finite state set whose states are mapped using an induced state mapping that accommodates the 90 degree rotation of the 8 PSK constellation mapping for each branch of the trellis.

29. The communication transmitter of claim 26, wherein the analog baseband signal is provided to a communication channel.

30. The communication transmitter of claim 26, wherein:
a carrier frequency of the analog baseband signal is up converted thereby generating an up converted signal; and
the up converted signal is provided to a communication channel.

* * * * *